US006826541B1

(12) United States Patent
Johnston et al.

(10) Patent No.: US 6,826,541 B1
(45) Date of Patent: Nov. 30, 2004

(54) METHODS, SYSTEMS, AND COMPUTER PROGRAM PRODUCTS FOR FACILITATING USER CHOICES AMONG COMPLEX ALTERNATIVES USING CONJOINT ANALYSIS

(75) Inventors: Jeffrey M. Johnston, Durham, NC (US); Adam B. Richman, Charlotte, NC (US); David L. Sheeks, III, Durham, NC (US); Richard R. Shopmyer, Durham, NC (US)

(73) Assignee: Decision Innovations, Inc., Durham, NC (US)

( * ) Notice: Subject to any disclaimer, the term of this patent is extended or adjusted under 35 U.S.C. 154(b) by 527 days.

(21) Appl. No.: 09/704,349

(22) Filed: Nov. 1, 2000

(51) Int. Cl.[7] .............................................. G06F 17/35
(52) U.S. Cl. ................. 705/10; 705/1; 705/11; 705/35; 705/36; 705/2; 705/4; 702/81; 702/82; 702/83; 702/84; 702/179; 702/180; 702/181; 702/182; 702/183; 702/184; 702/185; 702/186; 702/188
(58) Field of Search ................... 705/10, 11, 1, 705/35, 36, 2, 4; 702/81–84, 179–181, 182–186, 188

(56) References Cited

U.S. PATENT DOCUMENTS

| 5,495,412 | A | * | 2/1996 | Thiessen ........................ 705/1 |
| 5,717,865 | A | * | 2/1998 | Stratmann ..................... 705/10 |
| 5,742,776 | A | * | 4/1998 | Toda ............................. 705/1 |
| 5,799,311 | A | * | 8/1998 | Agrawal et al. ............ 707/102 |
| 5,832,447 | A | | 11/1998 | Ricker et al. |
| 5,926,794 | A | * | 7/1999 | Fethe ........................... 705/11 |
| 6,064,984 | A | * | 5/2000 | Ferguson et al. ............. 705/36 |
| 6,249,768 | B1 | * | 6/2001 | Tulskie et al. ................. 705/7 |
| 6,397,212 | B1 | | 5/2002 | Biffar |
| 2001/0010041 | A1 | | 7/2001 | Harshaw |
| 2002/0004739 | A1 | | 1/2002 | Elmer et al. |
| 2002/0087388 | A1 | | 7/2002 | Keil et al. |

OTHER PUBLICATIONS

O'Hara, Colleen, "Comparison shop for health plans online", Federal Computer Week, Mar. 22, 1999, vol. 13, No. 7, 2 pages, retrieved from: Proquest.*
Appleby, Chuck, "Software for hard choices", Hospitals & Health Networks, Jun. 5, 1998, vol. 72, No. 11, 2 pages, retrieved from: Dialog, file 15.*
"Partnerships '98, Showcase and Games", www.odph-p.osophs.dhhs.gov/confrnce/partnr98, Apr. 28, 1998, 1 page, retrieved from: google.com.*
"California Consumer Health Scope", www.healthscope.org, Feb. 3, 1998, 3 pages, retrieved from: archive.org and google.com.*
"Decision Innovations signs agreement with U.S. Office of Personnel Management", PR Newswire, Nov. 12, 1998, 2 pages, retrieved from: Dialog, file 813.*
"Software by Decision Innovations Inc. Helps Employees Choose Health plans", PR Newswire, Dec. 9, 1997, 3 pages, retrieved from: Dialog, file 813.*

(List continued on next page.)

Primary Examiner—Tariq R. Hafiz
Assistant Examiner—Beth Van Doren
(74) Attorney, Agent, or Firm—Jenkins, Wilson & Taylor, P.A.

(57) ABSTRACT

Methods, systems, and computer program products for facilitating user choices among complex alternatives utilize conjoint analysis to simplify choices to be made by the user. A selector tool presents a user with a first and second series of choices relating to attributes of products or services available to the user. A utilities calculation engine calculates the relative utility of each of the products or services to the user and presents output to the user, which indicates the relative utility of each of the products or services. The user can then select the product or service that has the highest utility value for the user based on the calculated relative utility values.

86 Claims, 9 Drawing Sheets

OTHER PUBLICATIONS

Screenshots of Decision Innovations, www.decision-innovations.com, Dec. 6, 1998–Feb. 8, 1999, 10 pages, retrieved from: google.com and archive.org.*

"OPM makes life easier for people pondering health care open season choices", OPM News Release, Nov. 9, 1998, 2 pages, retrieved from: google.com.*

"News Briefs: Tool Available for Selecting a Health Plan", NIH Record, Nov. 3, 1998, 6 pages, retrieved from: google.com.*

"Federal Employees Health Benefits (FEHB)", www.opm.gov/insure, Feb. 2, 1999, 3 pages, retrieved from: archive.org and google.com.*

"Decision Innovations Signs Agreement with National Institute of Health", PR Newswire, Oct. 30, 1998, 2 pages, retrieved from: Proquest.*

Bard, Mark, "Purchasing Health Care and Value", Jan. 1998, vol. 77, Issue 1, pp. 1–5, retrieved from: Proquest Direct.*

"FEHB Program Carrier Letter", US Office of Personnel Management, May 31, 2000, pp. 1–2, retrieved from: Google.com.*

"FEDmanager", www.fedmanager.com, Nov. 16, 1999, pp. 1–3, retrieved from: Google.com.*

ANONYMOUS, www.asparity.com, web page printout (Feb. 6, 2002).

ANONYMOUS, "The Power of Real–Time Collaborative Customer Conversations," p. 1–2, (Jan. 31, 2002).

ANONYMOUS, "Our Customers Benefit From Powerful Partnerships," p. 1, (Jan. 31, 2002).

ANONYMOUS, "Online Insight and Top 10 National Homebuilder Break New Ground Launching Online Home Finder Solution," p. 1–3, (Jan. 31, 2002).

ANONYMOUS, www.beazer.com, web page printout, (Jan. 28, 2002).

ANONYMOUS, www4.activebuyersguide.com, web page printout (Jan. 24, 2002).

* cited by examiner

Selector Tool
Step 1 - Attribute Selection

Please check which of the following attributes (characteristics) are important to you when making a health care plan choice. You may select as many as you would like (the more you select, the longer the exercise will take so be certain to choose those attributes that are important to you). However, there must be at least 4 attributes checked for the tool to work. As you will note, "Monthly Employee Contribution" is already checked for you since our research has found that it usually plays an important role in any health care plan selection.

To see the definition of any attribute listed, simply click on the attribute and you will be presented with its definition.

For a more detailed explanation of how the tool works see How the Selector Tool Works.

Cost
- [✓] Monthly employee contribution  Default Selected
- [ ] Annual deductible
- [ ] Separate per admission hospital deductible
- [ ] In-patient hospital services coverage
- [ ] Your cost per doctor's office visit
- [ ] Your cost per specialist visit
- [ ] Your cost per emergency room visit
- [ ] Prescription drug coverage

Access
- [ ] Coverage of brand name prescription drugs of choice
- [ ] Ability to self-refer to a specialist

*FIG. 4*

METHODS, SYSTEMS, AND COMPUTER PROGRAM PRODUCTS FOR FACILITATING USER CHOICES AMONG COMPLEX ALTERNATIVES USING CONJOINT ANALYSIS

TECHNICAL FIELD

The present invention relates to using a proven social science statistical technique called conjoint analysis to facilitate choices among complex alternatives. More particularly, the present invention relates to methods, systems and computer program products for facilitating individual user choices among complex alternatives using a unique adaptation of conjoint analysis.

BACKGROUND ART

As a research methodology, conjoint analysis has been in use in the academic and commercial research community for many years (since the mid-1970's), and has been commonly used for marketing research purposes to assess consumer preferences among competing products or services.

Generally, conjoint analysis is a tool that researchers use to estimate the relative importance of the attributes that comprise the "alternatives" in the "choice set" and how much utility each "setting" of each "attribute" has for individuals. Results are often used to simulate the effect on market share that various changes in the "attribute settings" have and thus to fine tune "alternatives" (e.g. identify the optimal price for a product) and to forecast market share. While many forms of conjoint analysis exist, there are two general defining properties of any conjoint process: 1) each at some point gathers data from individuals by asking each individual to consider (the "con" in conjoint) two or more variables simultaneously or jointly (the "joint" in conjoint) and 2) each uses the gathered data (responses) to estimate how much utility or value each "attribute setting." Typically, conjoint data is gathered from a sample of users and then analyzed with no flow of information back to the user. Thus, there exists a long-felt need for applications that use conjoint analysis to facilitate individual user choices among complex decisions by providing conjoint analysis results back to the user.

For example, this need is particularly acute in the area of employer-sponsored health plans. Many large- and medium-sized employers offer a number of health plan options for employees. Each health plan includes various features, such as monthly premium, annual deductible, prescription drug coverage, etc. Due to the number of plans and the number of different features of each plan, the choice between plans becomes difficult for the individual employee. Moreover, the employer typically cannot advise an employee to choose one plan over the other because the employer can be held liable if the employer advises an employee to choose a plan that does not pay for some of the employee's medical expenses. Accordingly, in the employer-sponsored health plan selection process, there exists a long-felt need for methods and systems for facilitating employee choices among health plans.

DISCLOSURE OF THE INVENTION

According to one aspect, the present invention includes a software tool that embodies a "conjoint" model decision process permitting the simplification of difficult choices among complex alternatives into a sequence of short, simpler decisions. "Alternatives" in this context can be products (such as automobiles), services (such as health plans), combinations of complementary services and products, or virtually anything else individuals must decide to choose or not choose. Complex "alternatives" are those defined in terms of many "variables" such that in the decision process a lot of information must be considered. Complex "alternatives" often create difficult decisions that demand that the chooser trade-off the good and bad in each "alternative." For example, the choice between a high-quality bicycle versus a low-quality bicycle, given quality is the only criterion used in the selection, is an easy one. However, as the alternatives become more complex, the choice becomes more difficult and trade-offs must be made. The choice between a high-quality, $500 bicycle that comes in pink only versus a low-quality, $100 bicycle that comes in either green, black, or blue is a more difficult decision than that based on quality only.

The present invention uses, at its core, an adaptation of the conjoint model decision process. The use of the conjoint exercise allows to the tool to assist users in making difficult decisions less complex. By going through the exercise, unique profiles of what is important to the user are developed by the application.

In addition to developing user profiles, the present invention, at the end of the exercise, provides users with a "quality of fit" measure of how well each product or service available to them meets their unique profile.

In order to facilitate user choices among complex alternatives, the present invention includes computer software that requires an individual user to go through a series of less complex choices. The software first presents the user with a list of features. The user selects features which are of importance to the user. The software then presents the user with a first series of choices requiring the user to input or select first values indicating the relative importance of a best setting and a worst setting of each of the selected features. The user is then presented with a second series of choices requiring the user to input or select second values indicating the relative importance of the user's preference between first and second pairings of the selected attributes. Each pairing includes a best setting of one attribute and a worst setting of another attribute. The values input by the user in the second series of choices are interpreted as the mathematical difference equal to the relative importance of a best and worst setting of one attribute minus the relative importance of a best and a worst setting for the other attribute in the pairing. A final importance value is calculated for each of the attributes based on the initial relative importance values in the first series of choices and the mathematical difference values. Products and services available to the user are rated based on the final importance values. The user is then presented with data indicating the relative utility to the user of each of the products or services.

Terminology

Before proceeding, a review of keywords and key phrases and their definitions used in this document is warranted. These keywords are placed in double quotes throughout the document to indicate their use may be somewhat different from common use.

| Keyword or Key Phrase | Definition |
|---|---|
| "user" | A person going through the software exercise to gain help in making a choice |
| "alternative" | A single product or service (among a set of products or services) the "user" can potentially choose |
| "choice set" | All the "alternatives" the "user" is eligible to choose from |
| "attribute" | One of numerous variables, each defined as the continuum between its worst "setting" and best "setting," used to define the "alternatives" |
| "setting" (or "attribute setting") | The value a particular hypothetical or actual "alternative" has for a particular "attribute"; the hypothetical "alternatives" studied during the data-gathering phase of the algorithm are all specified in terms of the worst "setting" vs the best "setting" for each "attribute," whereas actual "alternatives" available to the "user" may be specified by "settings" anywhere along each "attribute's" continuum |
| "importance" | A measure that the user gives directly via the importance-of-the-difference (between worst and best "settings") screens of the relative importance of a single "attribute" |
| "difference in importance" | A measure that the user gives directly via the trade-off screens of the (mathematical) difference in the "importance" of two "attributes" |
| "final computed importance" | A final estimate of the true relative importance of an "attribute" to a "user" |
| "setting utility" (or "attribute setting utility") | The relative (relative to all "attribute settings") worth or utility of a particular "attribute setting" (anywhere along the "attribute" continuum) to a particular "user" |
| "total utility" | The total relative (relative to all "alternatives" available to that user) worth or utility of a particular "alternative"; defined as the simple sum across "attributes" of the "setting utilities" |

To ensure these keywords and phases are understood, the following example is given.

A person is trying to make a choice between a medium-quality bicycle priced at $250 and a high-quality bicycle priced at $375. The person is given a tool that assists the person in the selection. The tool requires the person to state on a 1-to-5 scale the relative importance of quality and price. For purposes of this example, it is assumed that the person selects 5 and 4, respectively. The values "5" and "4" are "importance" measures as defined above. The tool also asks the person to rate to what degree the person would prefer a high-quality, $500 bicycle to a low-quality, $100 bicycle. In this example, it is assumed that the person indicates a preference for the higher quality, more expensive bicycle, a "+1" on a −4-to-+4 scale. The value +1 is a "difference in importance" value as defined above. The tool then computes that the true importance (on a 1-to-5 scale) of quality and price for this person is a 4.7 and a 4.1, respectively. The values 4.7 and 4.1 are "final computed importance" values, as defined above. These values are used in turn to compute that high-quality is worth 25 (unitless) points to the person whereas medium quality is worth 15 points. The values "15" and "25" are "setting utilities" for the quality and price attributes. Similarly, the tool computes that $250 is worth 15 points to the person and $375 is worth 10. Thus, the tool computes that the total worth of the medium-quality bicycle priced at $250 is 30 points (15+15) and that the total worth of the high-quality bicycle priced at $375 is 35 points (25+10). The 30 and 35 point values are "total utility" values as defined above. Because 35 is higher than 30, the tool has computed that the medium-quality bicycle priced at $250 is worth slightly less to the person, all things considered, than the high-quality bicycle priced at $375. Thus, the tool recommends that the person should choose the high-quality bicycle priced at $375. The following table provides a summary of examples of each keyword or key phrase from the above example.

| Keyword or Key Phrase | Example |
|---|---|
| "user" | The person shopping for a bicycle |
| "alternative" | The medium-quality bicycle priced at $250 and the high-quality bicycle priced at $375 are the actual "alternatives"; the high-quality, $500 bicycle and the low-quality, $100 bicycle are the hypothetical "alternatives" used in the data-gathering phase |
| "choice set" | The medium-quality bicycle priced at $250 and the high-quality bicycle priced at $375 together form the actual choice set for the "user"; the high-quality, $500 bicycle and the low-quality, $100 bicycle form a hypothetical "choice set" to which the "user" is asked to react. |
| "attribute" | Quality is an "attribute" as is price |
| "setting" (or "attribute setting") | $375 is an actual "setting" of price; $100 is a hypothetical "setting" for price |
| "importance" | The "5" given for quality |
| "difference in importance" | The "+1" |
| "final computed importance" | The "4.7" for quality |
| "setting utility" (or "attribute setting utility") | The "25" for the high-quality "setting" of quality |
| "total utility" | The "30" for the medium-quality bicycle priced at $250 "alternative" |

One goal in developing the present invention was two-fold. First, create an adaptation of conjoint that is as user friendly as possible (keep it short and easy to understand). Second, go beyond the end of traditional conjoint (developing "utilities") and apply these utilities to the performance of a set of products, presenting the user with a sorted list of how well each product meets their stated preferences. In adapting a research statistical technique, traditionally used to study group preferences, and using it to match individual consumer preferences to actual products or services, the present invention application has established a highly useful product in the marketplace.

As mentioned above, conjoint has been in use since the 1970's. While there are a variety of implementations of the conjoint algorithm in the market the design chosen for implementation of the present invention is exceptionally simple, and yet robust. In addition, the way the present invention has been developed makes it unique. For example, features of real products are evaluated and levels are created, so that all products can be compared by the application in a purely objective basis. The feature attribute descriptions are made as simple and as straightforward as possible. In addition, after the user completes the process of selecting attributes features of the product, making importance of difference decisions, and then trade-off decisions, the application presents results to the user in very simple bar-chart form. The application shows all products available to the user in priority order, based on how well each product matches the preference utility of that individual.

The algorithm utilized by the present invention is unique, in that it provides for paired trade-offs (two by two comparisons of end-point "attribute" characteristics) instead of the usual more complicated trade-offs involving more than two "attributes" defined not only by their end-points (best and worst "settings") but by numerous "settings" along their entire continuum. As used herein, the term "endpoints" refers to the best and worst settings of an attribute. For example, in the bicycle example discussed above, $100 and $500 are endpoints for the price attribute; whereas "high" and "low" are endpoints for the quality attribute.

According to another aspect of the invention, an "X" matrix utilized to estimate "attribute" "utilities". An "X matrix", as described herein, is a configuration of explanatory variable data, or numbers, in a mathematical format. The "X matrix" designates the independent variable values used in the ordinary least squares matrix set, whereas the "Y Matrix" designates the dependent variable values. Examples of X and Y matrices and their use in calculating utilities for attributes will be discussed in more detail below.

Yet another aspect of the invention is the way in which the results of a user's interaction with the tool are "fed back" to the user. For example, each individual's alternative choices of products, services or concepts are ranked in declining order of "total utility." This way of "reporting" back to each user on how their priorities and decision criteria "value" each alternative clearly indicate the "best fit" choices among all the alternatives in an individual's "choice set."

While one use of the present invention is "attribute" preference-based decision support tool, the software also simultaneously creates databases of user-level "preference data" (i.e. "final computed importance" and "setting utility" data) and other descriptive data. This data has value in the marketplace to producers and middleman organizations as conjoint research and can be used for developing analyses of market share "attribute" importance, and other outcomes of the decision-making process. The creation and merchandizing of this data is very much a fundamental aspect of the tool's value.

Currently, the focus of use for the present invention is in the selection of health plans by consumers or employees of medium-sized or large employers. The fringe benefits of most employers of any size typically include health care financing, and it is not unusual to find medium and large employers offering 3, 4 or more health plans to its employees. An employee of those companies uses the present invention to help him/her select that plan from among the alternatives offered which is best suited to him/her. As discussed above, employees are left by their employers to their own resources in selecting a health plan. The major barrier to a more activist policy by employers is one of liability for employee choices. Another barrier is an economic one since uncertain employees commonly consume huge amounts of human resources staffer time seeking guidance in making their choices among health plans. Left to their own devices, employees will seek advice from other employees or may select a plan based on one or a few criteria—such as premium cost, type of plan or perhaps two or three features of a plan. The present invention alleviates these problems by applying conjoint analysis to facilitate user choices among a large array of complex alternatives.

While the present invention is suitable for assisting employees choose health plans, it has been developed to be generic/flexible enough to be applied to any complex decision. For example, the algorithms described herein are suitable for facilitating user choices among a variety of complex alternative, supplemental insurance, 401k plans/mutual funds, and other product or service categories. Prototypes of this application have been developed, for instance, to assist consumers in choosing computers, and businesses and consumers to choose energy companies. There are many other uses of this application currently being planned.

BRIEF DESCRIPTION OF THE DRAWINGS

Preferred embodiments of the invention will now be explained with reference to the accompanying drawings, of which:

FIG. 4 is a screen shot of attribute selection page 302 illustrated in FIG. 3;

DETAILED DESCRIPTION OF THE INVENTION

Overview

Figure 1:
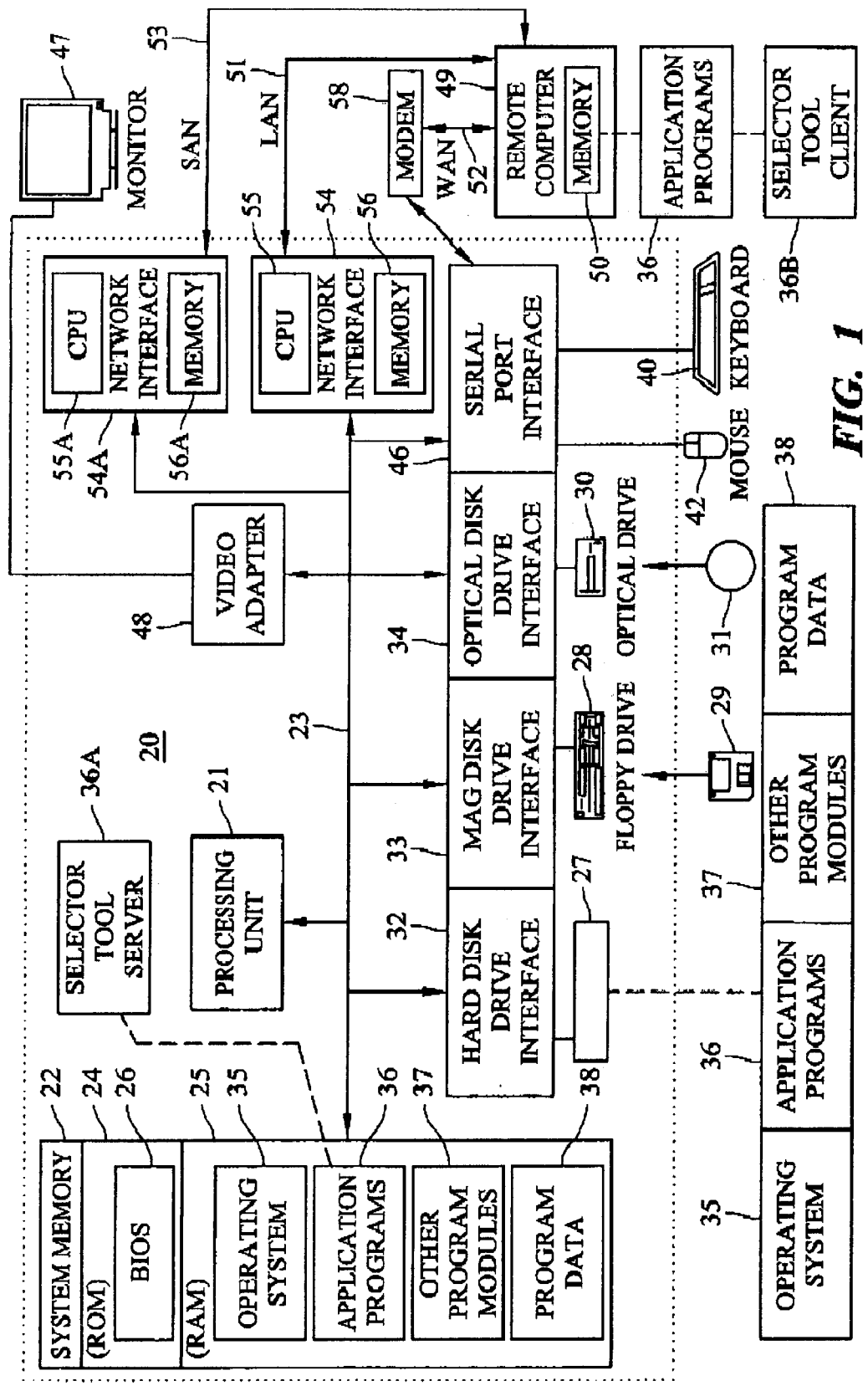
FIG. 1 is a block diagram illustrating an exemplary operating environments for embodiments of the present invention.

A method for facilitating user choices among complex alternatives according to an embodiment of the present invention is comprised of three main steps followed by results and detailed product comparisons. Each of these steps through the exercise are interactive—that is, they engage the "user" and require the "user's" input. In addition, each step relies on the previous step. How the "user" responds in one step will affect what the user is asked to do in subsequent steps. At the end of these steps the user is provided with results.

The main components of the tool are:
1. "Attribute" Selection—branded on the site displayed as "Attribute Selection"
2. "Importance" Ratings—branded on the site displayed as "Importance of Difference"
3. "Difference in Importance" Ratings—branded on the site displayed as "Trade-Offs"
4. Results
5. Detailed "Alternative" Comparisons Software for implementing each of these steps will be discussed in more detail below following a discussion of the operating environment for the software.

Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38.

A user may enter commands and information into the personal computer 20 through input devices such as a keyboard 40 and a pointing device 42. Other input devices (not shown) may include a microphone, touch panel, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers. With regard to the present invention, the user may use one of the input devices to input data indicating the user's preference between alternatives presented to the user via monitor 47.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet.

System area networking environments are used to interconnect nodes within a distributed computing system, such as a cluster. For example, in the illustrated embodiment, the personal computer 20 may comprise a first node in a cluster and the remote computer 49 may comprise a second node in the cluster. In such an environment, it is preferable that the personal computer 20 and the remote computer 49 be under a common administrative domain. Thus, although the computer 49 is labeled "remote", the computer 49 may be in close physical proximity to the personal computer 20.

When used in a LAN or SAN networking environment, the personal computer 20 is connected to the local network 51 or system network 53 through the network interface adapters 54 and 54A. The network interface adapters 54 and 54A may include processing units 55 and 55A and one or more memory units 56 and 56A.

When used in a WAN networking environment, the personal computer 20 typically includes a modem 58 or other means for establishing communications over the WAN 52. The modem 58, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

In FIG. 1, exemplary application programs 36 used to implement the present invention include a selector tool server 36A implemented on local computer 20 and a selector tool client 36B implemented on remote computer 49. Selector tool server 36A may communicate with selector tool client 36B over local area network 51, system area network 53, or wide area network 52. Exemplary communication protocols that may be used for communication between selector tool server 36A and selector tool client 36B over LAN 51 or SAN 53 include HTTP over TCP/IP. Exemplary communication protocols that may be used to communicate between selector tool server 36A and selector tool client 36B over WAN 52 include the point-to-point protocol (PPP).

Selector tool server 36A preferably performs the functions of presenting the user with a series of choices relating to complex alternatives, calculating relative utility scores of the alternatives based on the choices, and feeding back to the user an indication of which of the complex alternatives has the highest utility for that user. Selector tool client 36B may establish a connection with selector tool server 36A in order to provide communications between the user and selector tool server 36A. In a preferred embodiment, selector tool client 36B comprises a web browser, such as Internet Explorer available from Microsoft Corporation of Redmond, Wash., or Netscape Navigator available from America Online Corporation of Reston, Va.

The present invention is not limited to a selector tool that is implemented as a selector tool server and a selector tool client connected via a network. For example, in an alternative embodiment, the present invention may be implemented entirely on a local machine wherein the selector tool comprises an application program that presents the user with a series of choices relating to complex alternatives, calculates the relative utility of the complex alternatives, and feeds the relative utility information back to the user entirely on the local machine. However, a networked environment is preferred so that multiple users can access the selector tool server. For example, for company health plan selection, selector tool server 36A may be resident on a server accessible by company employees. In this manner, all employees may access selector tool server 36A using a web browser that is common on most personal computers. In addition, when the health plans offered by a company change, it is easier to update a server or a set of servers than it is to update software on each individual user's personal computer.

Figure 2:
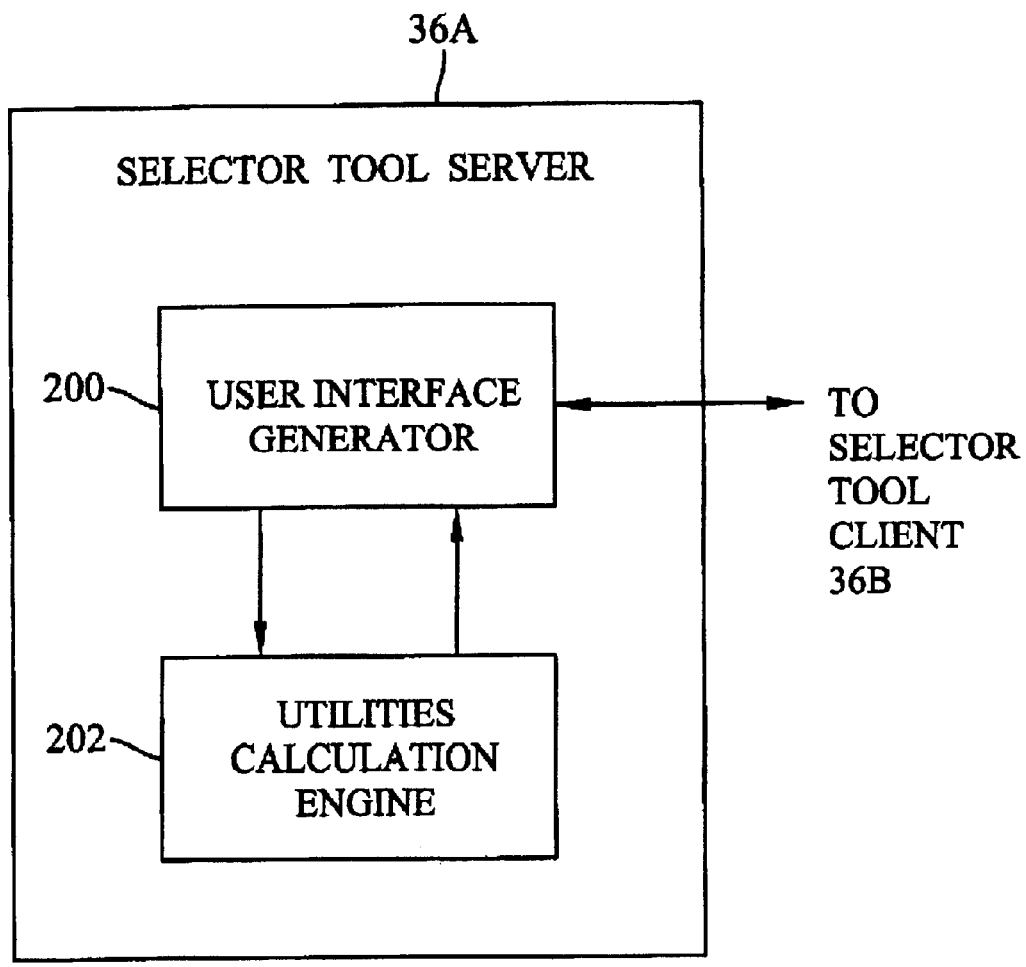
FIG. 2 is a block diagram of a selector tool server according to an embodiment of the present invention.

FIG. 2 is a block diagram of selector tool server 36A. In the illustrated embodiment, selector tool server 36A includes a user interface generator 200 and a utilities calculation engine 202. User interface generator 200 may be a web server. User interface generator 200 preferably presents a series of input screens to the user relating to choices between complex alternatives. User interface generator 200 also receives input from the user and delivers that input to utilities calculation engine 202. Utilities calculation engine 202 calculates a total relative utility value for each of the complex alternatives, based on the user choices. Utilities calculation engine 202 outputs the total utilities calculations to user interface generator 200. User interface generator 200 then outputs the total utilities values to selector tool client 36B.

Figure 3:
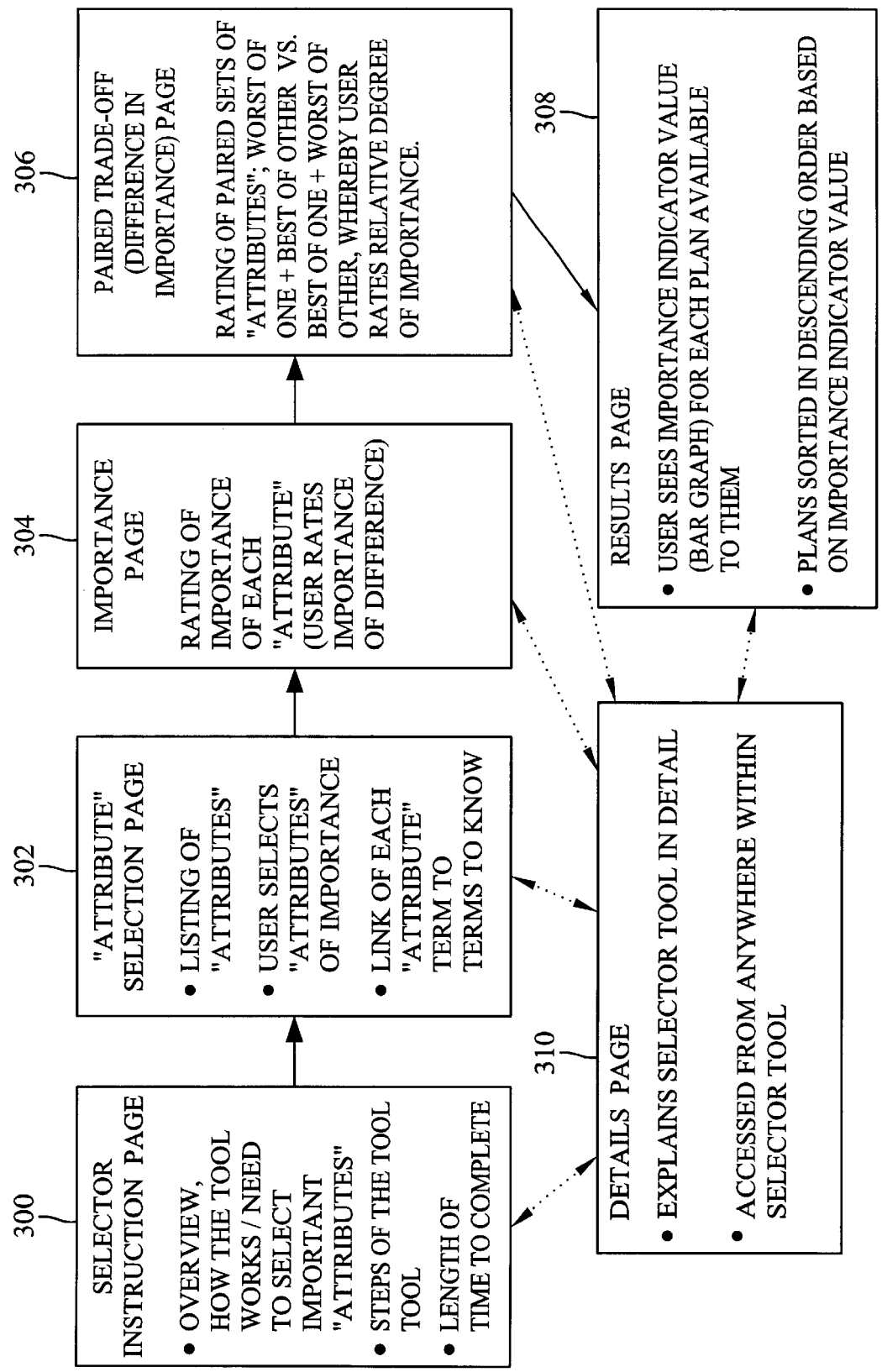
FIG. 3 is a block diagram illustrating the relationship between screens presented to the user by the selector tool server according to an embodiment of the present invention.

FIG. 3 is a block diagram of exemplary screens that may be presented by user interface generator 200 illustrated in FIG. 2. In FIG. 3, selector tool instruction page 300 provides an overview of how the selector tools works, steps required to be performed by the user in using the tool, and the length of time required to complete the selection. Because selector tool instruction page 300 does not provide an functionality important to describing the invention, further description relating thereto will not be presented herein.

Attribute selection page 302 provides a listing of attributes, allows the user to select attributes that are of importance to the user, and links each attribute to terms to know. FIG. 4 is a screen shot of an exemplary attribute selection page 302. In FIG. 4, attribute selection page 302 includes an instruction portion 400 that provides the user with instructions on how to use attribute selection page 302. In the illustrated example, instruction portion 400 instructs the user that the user must select at least four attributes in order for the tool to work. Attribute selection page 302 also includes an attribute selection portion 402 that allows the user to select attributes that are of importance to the user and that allows the user to access definitions of terms. In the illustrated example, attribute selection portion 402 includes a table containing attribute categories relating to employer-sponsored health plans, such as cost and access. Each attribute category includes a series of attributes. In the illustrated example, the "cost" attribute category includes attributes such as monthly employee contribution, annual deductible, separate per-admission hospital deductible, etc. Similarly, the "access" attribute category includes attributes such as coverage of brand name prescription drugs of choice and the ability to self-refer to a specialist. In order to select an attribute of importance, the user clicks on the appropriate box using an input device, such as a mouse. The attributes selected by the user will be used in calculating the relative utilities of health plans.

Figure 5:
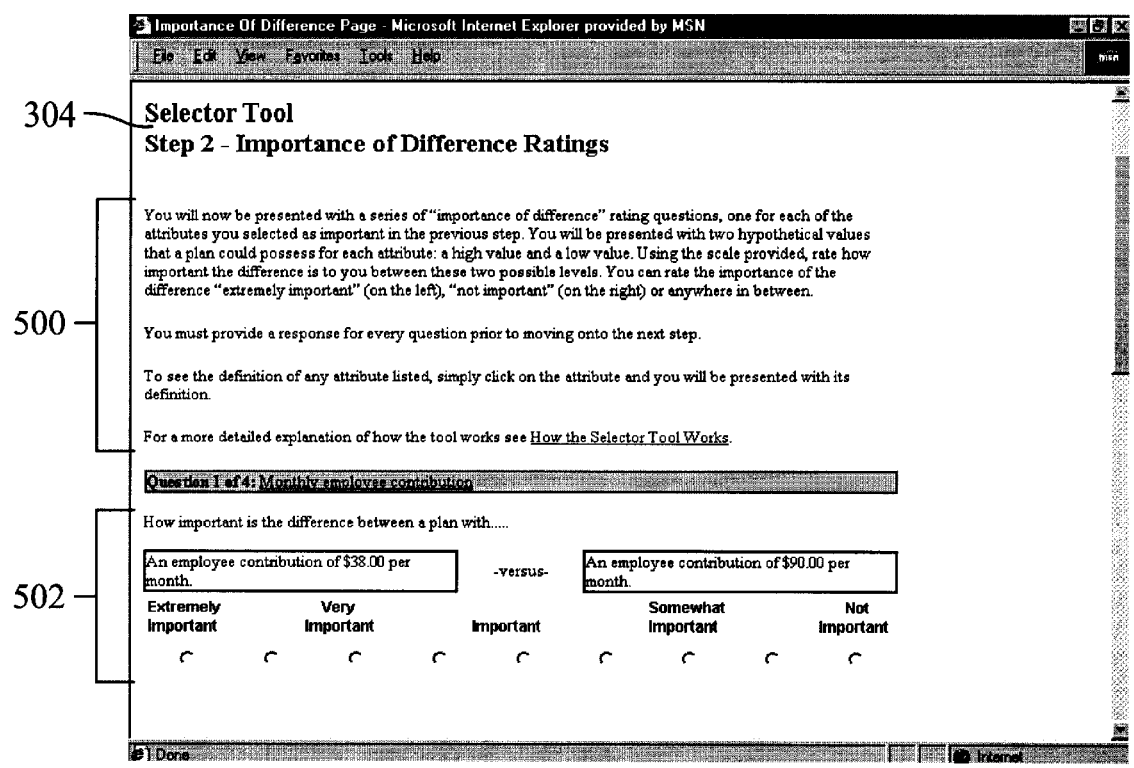
FIG. 5 is a screen shot of importance page 304 illustrated in FIG. 3.

Referring back to FIG. 3, once the user has selected attributes that are of importance to the user, the user is presented with importance page 304, which allows the user to rate the importance of each attribute. FIG. 5 is a screen shot illustrating an exemplary embodiment of importance page 304. In FIG. 5, importance page 304 includes an instructions portion 500 that explains to the user the mechanics of using importance page 304. Importance page 304 also includes an importance of difference portion 502 that presents the user with two hypothetical values that a plan could possess for each attribute: a high value and a low value. A scale is provided that requires the user to rate how important the difference is to the user between the two possible alternatives. In the illustrated example, the attribute being evaluated is monthly employee contribution to a health plan. The user is asked to rate the importance of the difference between a plan with an employee contribution of $38 per month versus a plan with an employee contribution of $90 per month. A scale is provided below the choice that allows the user to rate the degree of importance between the two settings for each variable selected: a best setting and a worst setting. In the illustrated example, the user may indicate that the difference between an employee contribution of $38 per month and an employee contribution of $90 per month is very important. Importance page 304 stores a value indicative of the relative importance of the difference to the user and passes this value to utilities calculation engine 202 (illustrated in FIG. 2).

The user is preferably presented with a series of preference pages 304 that require the user to rate the relative user's preference between best and worst settings of variables relating to an attribute. Once the user has completed the importance of difference rating step, referring back to FIG. 3, the user is presented with a series of paired trade-off pages 306. Each paired trade-off page 306 requires the user to rate paired sets of attributes. In particular, the user is presented with the best setting of one attribute and the worst setting of another attribute versus the worst setting of the first attribute and the best setting of the second attribute and the user is asked to rate the relative degree of importance of the best and worst settings of the different attributes.

Figure 6:
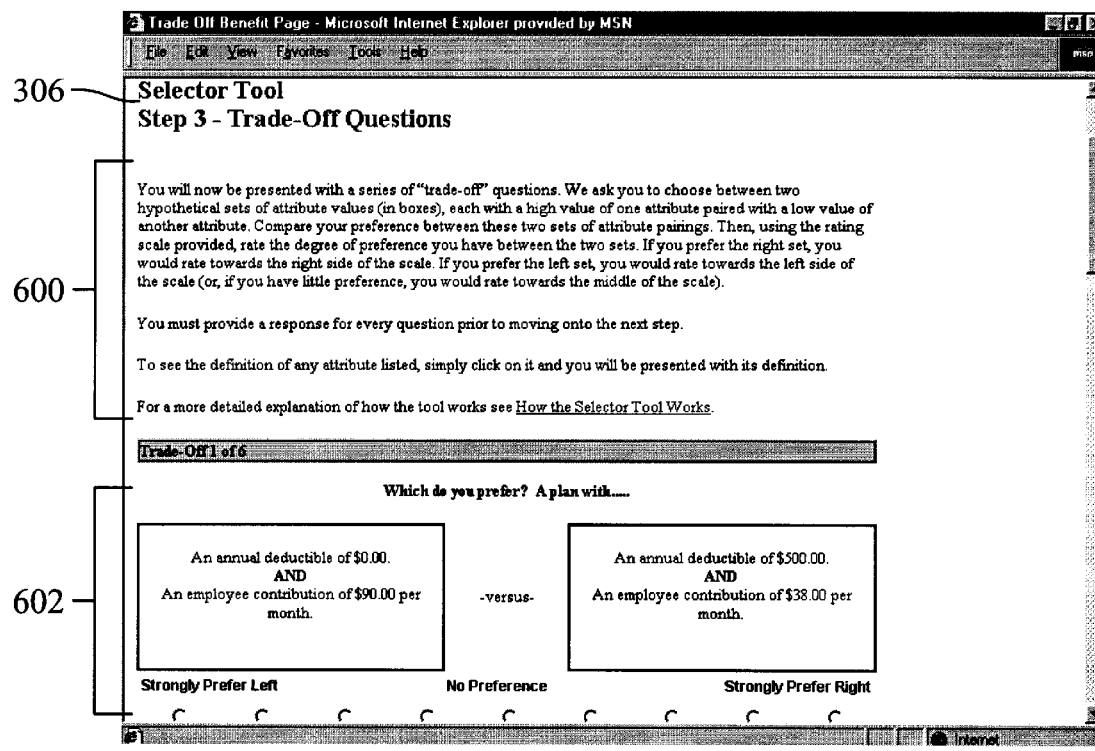
FIG. 6 is a screen shot of paired trade-off page 306 illustrated in FIG. 3.

FIG. 6 illustrates an exemplary paired trade-off page 306 according to an embodiment of the present invention. In FIG. 6, paired trade-off page 306 includes instructions portion 600 that instructs the user on how to select between the alternatives presented on page 306. Paired trade-off page 306 also includes a trade-off selection portion 602 which presents the user with two pairings of two different attributes. In a preferred embodiment, the user is presented with a first pairing that includes a highest setting of one attribute and a lowest setting of another attribute and a second pairing that contains the highest setting of one attribute and the lowest setting of another attribute. For example, if the attributes are A1 and A2, the first pairing would be high(A1) AND low(A2), and the second pairing would be low(A1) AND high(A2). In the example illustrated in FIG. 6, the pairings of attributes are as follows: an annual deductible of $0 and an employee contribution of $90 per month versus an annual deductible of $500 and an employee contribution of $38 per month. The represent combinations of high and low settings of the illustrated attributes—monthly contribution and annual deductible. The user is required to rate the user's preference between the pairings using discreet values on the scale provided below the pairings. For example, if the user strongly prefers an annual deductible of $500 and an employee contribution of $38 per month versus an annual deductible of $0 and an employee contribution of $90 per month, the user may select one of the circles on the right side of pair trade-off page 306.

The user is presented with a series of paired trade-off screens 306 and is required to rate the user's preference for each of the pairings. Values indicative of each of the user-selected ratings are provided to utilities calculation engine 202 illustrated in FIG. 2.

Once the user has completed all of the importance pages 304 and paired trade-off pages 306, the selector tool performs the following steps:

1. Using utilities calculation engine 202, a "final computed importance" is calculated for each "attribute" used in the exercise. This is a measure of the relative importance of the "attribute" with respect to the "settings" of that "attribute" presented as well as to the relative importance of all the other "attributes."
2. Utilities calculation engine 202 gathers the performance levels (actual "settings") for each "alternative" available to the "user," for each "attribute."
3. For each "alternative" and "attribute" utilities calculation engine 202 creates a "setting utility" score for each "alternative" available to the "user." Details of this calculation are described below. The sum of the "setting utility" scores for all the "attributes" for an "alternative" become the "alternative's" "total utility" score. This value is unique to each "alternative"/"user" combination.
4. The "user" is then presented with a list of all the "alternatives" available to them with a graphical representation of the relative "total utility" scores of the "alternatives." With this information, the user can ascertain how well each "alternative" matches their stated importance.

Figure 7:
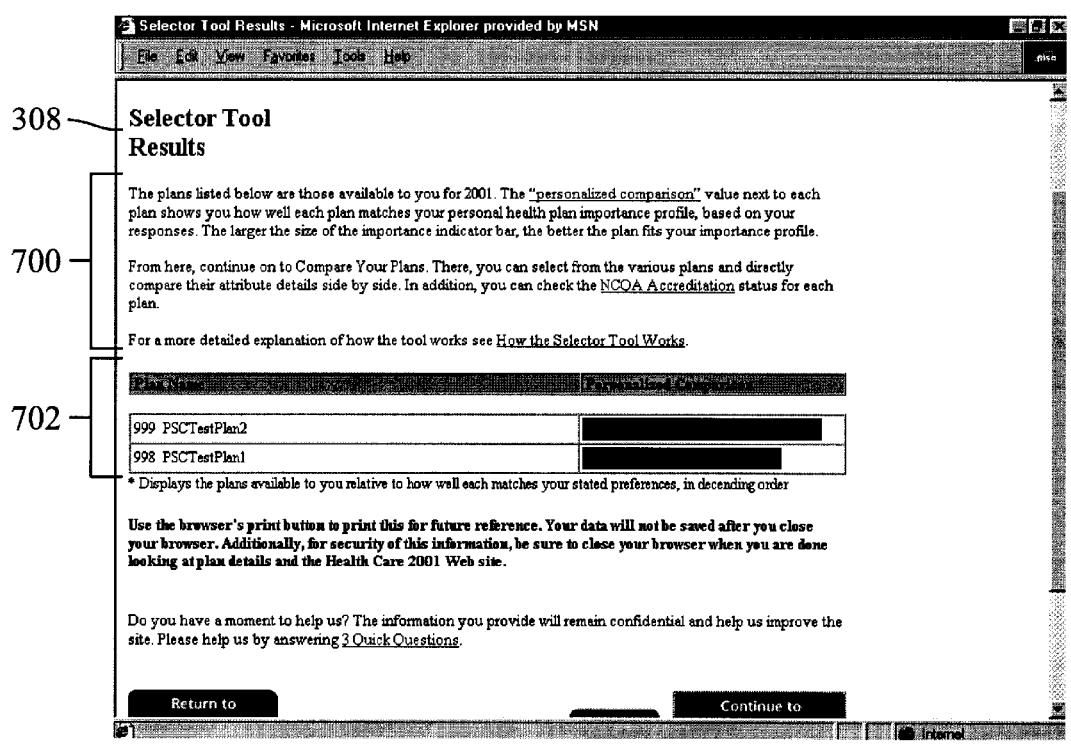
FIG. 7 is a screen shot of results page 308 illustrated in FIG. 3.

Referring back to FIG. 2, results page 308 presents the results from the utilities calculation to the user. The utilities are measured in terms of a preference value that indicates the relative utility of each choice to that particular user. Alternative choices may be sorted in any order, such as descending order. FIG. 7 illustrates an exemplary results page 308 according to an embodiment of the present invention. In FIG. 7, results page 308 includes a description portion 700 that describes the contents of results page 308. Importance indicator portion 702 includes a table having a bar graph that graphs the importance indicator value for each of the complex alternatives. In the illustrated example, the bar graph indicates that PSC test plan 2 more closely matches the user's preferences than PSC test plan 1. Accordingly, based on results page 308, the user should select PSC test plan 2 as the user's health plan.

Figure 8:
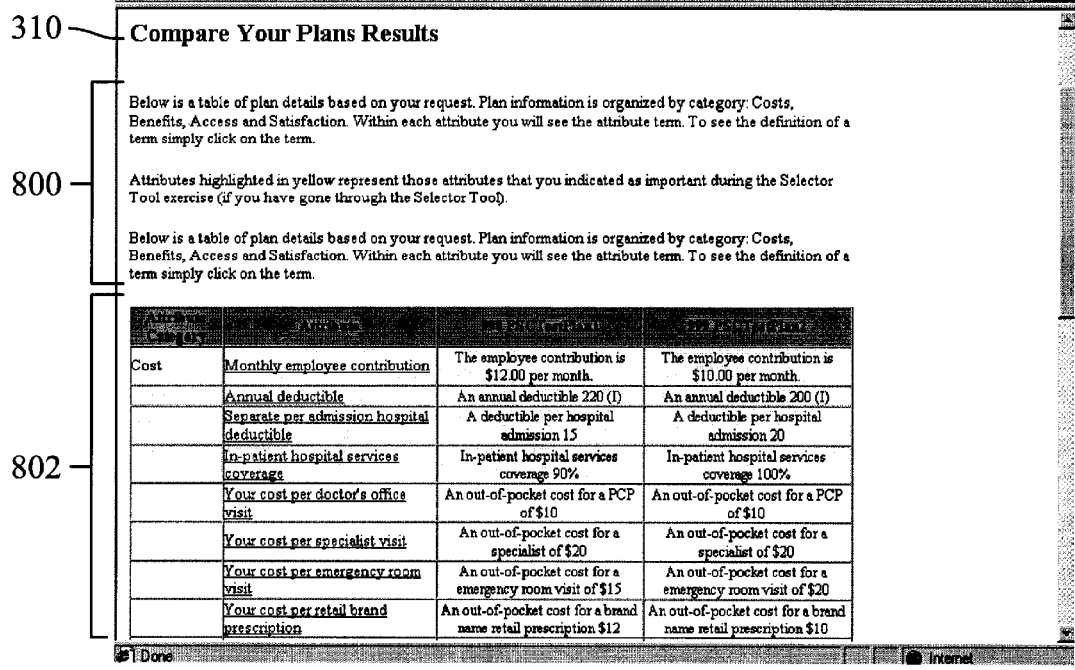
FIG. 8 is a screen shot of details page 310 illustrated in FIG. 3.

Referring back to FIG. 3, a details page 310 can be accessed from any of the other pages 300, 302, 304, 306, and 308. Details page 310 explains the feature of the page from which details page 310 was accessed. For example, if details page 310 is accessed from results page 308, a more comprehensive explanation of the results will be presented. FIG. 8 illustrates an example of details page 310 accessed from results page 308. Referring to FIG. 8, details page 310 includes an explanation portion 800 that explains the content of details page 310. Details page 310 includes a content table 802 that compares the attributes of two choices presented to the user. In the illustrated example, the choices are employer-sponsored health plans. The attributes include features of the health plans, such as annual deductible, employee contribution, and out-of-pocket costs for prescriptions.

Thus, as illustrated above, the present invention provides a user-friendly graphical user interface that simplifies complex choices for users. The users are presented with two series of simple choices. Based on the user's responses to the simple choices, the utilities calculation engine of the present invention calculates the relative utility of complex choices for the user. By breaking the complex choices into series of simple choices, the present invention greatly facilitates user selection among complex choices.

Detailed Description of Calculations Performed by Utilities Calculation Engine

The statistical algorithm implemented by utilities calculation engine 202 involves the calculation of "regression" coefficients ($u_k$) for the equation:

$$y_i = \alpha_i + u_1 * a_{1i} + u_2 * a_{2i} + \ldots + u_k * a_{ki} + e_i$$

where $y_i$ is a variable with i possible observations per tool user, representing the quantitative values chosen by a individual to measure his or her judgment of the importance of the difference between some best value of each important "attribute" and some worst value of the "attribute", as well as values input by that individual to measure his degree of attraction to either of two two-"attribute" alternatives (or choices) (in which the key characteristic of those two-"attribute" alternatives is that the first "attribute" has its best possible value while the second has its worst possible value, and the other alternative's two "attributes" have the characteristic that the first "attribute" has its worst possible value while the second "attribute" has its best possible value). It is important to note that while the "user" provides the relative degree to which he/she prefers one "best/worst" "alternative" (i.e. product) to the other, the algorithm for deriving "final estimated importances" (i.e. the regression analysis) interprets these responses as the mathematical difference in the "importances" of the two "attributes." This unique property of the algorithm is so important that the following example is warranted to clearly illustrate the mechanics.

Assume the two "attributes" of a trade-off screen 306 are price and quality and assume the "alternatives" are bicyclesThus, the trade-off screen might look like the following: .

| $500 High Quality | vs. | $100 Low Quality |
|---|---|---|
| −4  −3  −2  −1 | 0 | +1  +2  +3  +4 |

The user is asked to respond with a number between −4 and +4, with a −4 meaning he/she strongly prefers the High Quality, $500 bicycle and a +4 meaning he/she strongly prefers the Low Quality, $100 bicycle. Values between +4 and −4 indicate less strong preferences, with 0 (zero) indicating the user prefers the two bikes equally. Because all "attributes" are studied in the trade-off screens only in terms of their best and worst "settings" and also because exactly two "attributes" are studied in each trade-off screen 306, any value on the +4 to −4 continuum has a second interpretation, besides the relative preference of one "alternative" vs. the other, which is the mathematical difference in the "importance" of the two "attributes" being studied (where the "importance" values are on a +1 to +5 scale). Thus, if a user states a "+3" in the above trade-off, that can be interpreted to mean that price is more "important" than quality and precisely that the "importance" of price is 3 more "importance" points than the "importance" of quality. In other words, the user may have "importance" values for price and quality of +4 and +1 respectively, or +5 and +2 or +4.5 and +1.5 (the actual importance magnitudes are gauged elsewhere (not in the trade-off screens), in the "importance" (i.e. importance of difference) screens). Other trade-off values have similar interpretations (e.g. a "0" is interpreted as the "importance" of price and quality being equal; a "−4" is interpreted as the "importance" of price being 4 "importance" points less than the "importance" of quality (e.g. price "importance"=1 and quality "importance"=5). Another way to view this is that while the user is responding (with respect to moving from −4 to +4) in terms of left-of-screen "alternative" vs. right-of-screen "alternative," the software algorithm interpretation is bottom-of-screen "attribute" vs. top-of-screen "attribute"." This property (interpretation) of the algorithm may indeed be the single most unique aspect of utilities calculation engine 202.

The present invention is not limited to using any particular scale for rating user preferences with regard to difference in importance or trade-offs. The size and increments in the scale depend on the desired granularity and the algorithm used to generate the total utility value.

As described above, two types of data are gathered from users:

1. The importance of a single "attribute" (defined as the importance of the difference between the best and worst "settings" of that "attribute"), measured on a 1-to-5 scale (using importance pages 304).
2. The difference in the importance of two "attributes. Since the "importance" of each "attribute" is measured on a 1-to-5 scale (see 1 above), the "difference in importance" is measured on a −4-to-4 scale (since the minimum value is a 1 minus a 5 which equals −4 and the maximum value is a 5 minus a 1 which equals 4) (using paired trade-off pages 308).

Via regression analysis, both types of data are analyzed together as a single set of information. The result of this regression analysis is a single number for each "attribute" indicating the final estimate of how important the user feels the "attribute" is (on the original "importance" scale).

The way the data is coded is as follows:

Dependent Variable Vector Y

Type 1 "importance" data is simply bottom-augmented with the type 2 "difference in importance" data. Thus, if a user had been asked about 5 "attributes" and had given "importance" scores of 5, 4, 3, 2, and 1, the Y "importance" data would equal:

```
5
4
3
2
1
```

Similarly, if the user had seen 6 pairs of "attributes" and had given "difference in importance" ratings of −4, 3, 0, 1, 0, and −2, the Y "difference in importance" data would equal:

```
−4
 3
 0
 1
 0
−2
```

Thus, the final Y vector would equal:

```
 5
 4
 3
 2
 1
−4
 3
 0
 1
 0
−2
```

The number of rows equals the number of observations of data used in the regression analysis and are equal to the number of separate data values supplied by the user for "importance" and for "difference in importance" questions.

Independent Variable Matrix X

The X matrix associated with Type 1 "importance" data is made of rows that are "dummy" coded with a "1" indicating the "attribute" the user is referring to and 0's otherwise. Thus, assuming the "importance" scores of 5, 4, 3, 2, and 1 given above were in the order of first, second, third, fourth, and fifth "attributes, the X "importance" data would equal:

```
1 0 0 0 0
0 1 0 0 0
0 0 1 0 0
0 0 0 1 0
0 0 0 0 1
```

Note that it is not necessary that the order is first, second, third, fourth, and fifth, however. If the data had been in, say, order of second, first, third, fourth, and fifth attributes, then the X matrix would have looked like:

$$\begin{matrix} 0 & 1 & 0 & 0 & 0 \\ 1 & 0 & 0 & 0 & 0 \\ 0 & 0 & 1 & 0 & 0 \\ 0 & 0 & 0 & 1 & 0 \\ 0 & 0 & 0 & 0 & 1 \end{matrix}$$

For this example, the former order is assumed.

In addition to determining an X-matrix for the importance data entered through importance pages 304, utilities calculation preferably also determines an X-matrix for difference of importance data collected through paired trade-off screens 306.

The X matrix associated with the "difference of importance" responses is made of rows that are coded as "1" if the "attribute" is one of the pair being traded off and is the "attribute" shown either at the top or the bottom of the screen, "−1" if the "attribute" is one of the pair being traded off and is the "attribute" shown opposite the other "attribute" (at bottom if former is at top of screen and vice versa), and "0" if the "attribute" is not one of the pair being traded off. For example, assuming that the "top-bottom" pairs of "attributes" are first-second, second-third, third-fourth, fourth-fifth, fifth-first, and fourth-second, and the top "attribute" has its best "setting" on the right side of the screen and bottom "attribute" has its best "setting" on the left side of the screen (though this may be interchanged), the X matrix associated with the "difference of importance" data equals $$\begin{matrix} 1 & -1 & 0 & 0 & 0 \\ 0 & 1 & -1 & 0 & 0 \\ 0 & 0 & 1 & -1 & 0 \\ 0 & 0 & 0 & 1 & -1 \\ -1 & 0 & 0 & 0 & 1 \\ 0 & -1 & 0 & 1 & 0 \end{matrix}$$

The above X matrix is given only as an example. Pairings of "attributes" may be random or a systematic approach may be used to pair the attributes, as in an orthogonal or near-orthogonal design.

As before with the Y vector, the final X matrix is created by bottom-augmenting the "importance" data with the "difference in importance" data. Thus the final X matrix equals $$\begin{matrix} 1 & 0 & 0 & 0 & 0 \\ 0 & 0 & 0 & 0 & 0 \\ 0 & 1 & 0 & 0 & 0 \\ 0 & 0 & 1 & 0 & 0 \\ 0 & 0 & 0 & 1 & 0 \\ 1 & -1 & 0 & 0 & 0 \\ 0 & 1 & -1 & 0 & 0 \\ 0 & 0 & 1 & -1 & 0 \\ 0 & 0 & 0 & 1 & -1 \\ -1 & 0 & 0 & 0 & 1 \\ 0 & -1 & 0 & 1 & 0 \end{matrix}$$

Thus, the final set of data to be analyzed is as follows:

| Y vector | X matrix |
|---|---|
| 5 | 1 0 0 0 0 |
| 4 | 0 1 0 0 0 |
| 3 | 0 0 1 0 0 |
| 2 | 0 0 0 1 0 |
| 1 | 0 0 0 0 1 |
| −4 | 1 −1 0 0 0 |
| 3 | 0 1 −1 0 0 |
| 0 | 0 0 1 −1 0 |
| 1 | 0 0 0 1 −1 |
| 0 | −1 0 0 0 1 |
| −2 | 0 −1 0 1 0 |
| 2 | 0 0 0 1 0 |
| 1 | 0 0 0 0 1 |
| −4 | 1 −1 0 0 0 |
| 3 | 0 1 −1 0 0 |
| 0 | 0 0 1 −1 0 |
| 1 | 0 0 0 1 −1 |
| 0 | −1 0 0 0 1 |
| −2 | 0 −1 0 1 0 |

In summary, each row (of both the Y vector and the X matrix) represents a single response the "user" has given, the actual response being recorded in the Y vector. Each column of the X matrix represents an "attribute" the "user" has chosen as important (where rows with only 1's and 0's have a 1 in the column of the "attribute" that is the subject of the "importance"-of-difference screen and rows with 1's, 0's, and −1's have a 1 or −1 in a column to identify which attribute was at the top of and which attribute was at the bottom of the trade-off screen.

From this type data set, the B regression coefficients are calculated via $$B = (X'X)^{-1}X'Y,$$

where $^{-1}$ indicates the matrix inversion transformation and the single quote (') indicates the matrix transpose transformation, are directly interpretable as importance (on the 1-to-5 "importance" scale) scores for the "attributes" they modify. Each B coefficient is paired with and thus modifies one "attribute." A slight variation of this form is to include an additional column of ones ("1"s) in the leftmost position of the X matrix. The extra B coefficient in that instance is not associated with an "attribute" but is a measure of the intercept of the regression model, which theoretically equals zero. That is, in the absence of predicting anything about importance (e.g. an "importance" by plugging in a "1" or a "difference in importance" by plugging in a "1" and a "−1"), that is, only a series of zeros are plugged in, the model predicts zero. That is to say that the null condition of using the model to do nothing "predicts" a "0" (zero) "importance."

Each user chooses which m or more "attributes" he/she actually uses in making a selection, where m is a variable threshold and is set in advance. If this number exceeds n then the top n (based on the user's "importance" scores (and predetermined expert judgments of the importance of "attributes" if a tie-breaker is needed)) are used and it is only these that have "final computed importances" calculated via the above formula. Again, n is a variable threshold that is set in advance. For excluded "attributes, the "final computed importance" is set to zero. Thus, the number of "attributes" for which "final computed importances" are calculated varies from user to user. Currently, the software is written to allow for "importance" scores to be calculated for anywhere from four to fifteen "attributes" (that is, m=4 and n=15).

While it would be sufficient to simply use the (direct) "importance" scores for each "attribute" to help users select products/services, it is believed that the augmented data, the "difference in importance" data, greatly improves "final computed importances" and thus recommendation results. This is so because users are not actually told they are providing "difference in importance or trade-off" scores, but rather are told to gauge their preference for the best "setting" of one "attribute" paired with the worst of the other versus the worst "setting" of the one "attribute" paired with the best of the other. In this way, the user is actually comparing two products or services. Because only the best and worst "settings" are ever shown and because only two "attributes" are shown at a time, the interpretation of the responses is precisely "the mathematical difference in the importance of the two 'attributes' (each on a 1-to-5 scale)." This indirect way of obtaining information on the relative impact importance of "attributes" by comparing a series of hypothetical "alternatives" is a more realistic task for the "user" and is believed to enhance relative importance measurement.

With "final computed importances" estimated/calculated, the algorithm moves to using that data to calculate "total utility" scores for each product or service the user is in the market to buy and is eligible to buy. For each "attribute", the "final computed importance" (i.e. the B coefficient from the "attribute") is taken as the value of the worst "setting" of the "attribute" and five times the "final computed importance" is taken to be the value of the best "setting" of the "attribute". Then, using linear interpolation, the "setting" or specification of each product or service is transformed to a value to be presented to the user. For example, if the "final computed importance" of price is 3.2 and the worst price "setting" is $50, and the best price "setting" is $10, then a product with a price of $23.33 would have a "setting utility" for price of $$3.2+(5*3.2-3.2)*((23.33-50)/(10-50))=11.7344.$$

The utility numbers are "unitless"; 10.6656 is not 10.6656 dollars or anything else. They are relative numbers that allow for comparing specifications on different "attributes" for a given user. A "setting" on an "attribute" that has a "10" value for user is worth more than a "setting" on the same or another "attribute" that has a value of, say, "7." Individual "attribute" values are summed across the "attributes" making up the products or services, yielding a "total utility" score for each product or service for each user.

Utilities calculation engine 202 then rank orders the products or services for the user, in descending order of "total utility." The top product or service in this list is the best recommendation for the product or service the user should choose, given the relative importance the user places on the various "attributes" that make up the products or services and the actual specifications of the products or services.

Although the present invention can be used to calculate relative total utilities of products or services based on any number of attributes and attribute pairings, the following examples illustrate exemplary numbers of attributes and corresponding attribute pairings suitable for use with the present invention.

| Pairs | Interpretation |
|---|---|
| (1) 4 "attribute" engine | |
| 1,4 | This array of paired integers describes the comparisons |
| 2,3 | of combinations of "attributes" made by utilities |
| 3,4 | calculation engine 202. The pairings listed here are for 4 |
| 4,2 | attributes and are believed to be unique. The remaining |
| 3,1 | pairings listed herein are for 5 to 15 attributes and are |
| 1,2 | pairings listed herein are for 5 to 15 attributes and are |
| | also believed to be unique. |
| (2) 5 "attribute" engine | |
| 1,2 | |
| 2,4 | |
| 5,3 | |
| 3,1 | |
| 1,4 | |
| 3,4 | |
| 1,5 | |
| 5,2 | |
| (3) 6 "attribute" engine | |
| 1,2 | |
| 2,4 | |
| 5,3 | |
| 3,1 | |
| 6,4 | |
| 1,6 | |
| 3,4 | |
| 2,5 | |
| (4) 7 "attribute" engine | |
| 1,2 | |
| 2,4 | |
| 5,2 | |
| 6,7 | |
| 3,1 | |
| 7,3 | |
| 1,6 | |
| 3,4 | |
| 4,5 | |
| (5) 8 "attribute" engine | |
| 1,2 | |
| 5,8 | |
| 2,4 | |
| 5,2 | |
| 6,7 | |
| 3,1 | |
| 7,3 | |
| 1,6 | |
| 3,4 | |
| 8,6 | |
| 4,5 | |
| (6) 9 "attribute" engine | |
| 1,2 | |
| 9,7 | |
| 2,4 | |
| 7,3 | |
| 4,5 | |
| 6,1 | |
| 5,2 | |
| 8,6 | |
| 3,1 | |
| 8,9 | |
| 4,3 | |
| (7) 10 "attribute" engine | |
| 1,2 | |
| 9,7 | |
| 2,4 | |
| 7,3 | |
| 4,5 | |
| 10,9 | |
| 6,1 | |
| 5,2 | |
| 4,3 | |

-continued 8,6
3,1
8,10
(8) 11 "attribute" engine 1,2
9,7
2,4
7,3
4,5
10,11
6,1
5,2
4,3
11,9
8,6
3,1
8,10
(9) 12 "attribute" engine 1,2
9,7
2,4
10,12
7,3
4,5
12,11
6,1
5,2
11,9
4,3
8,6
3,1
8,10
(10) 13 "attribute" engine 11,13
1,2,
9,7
2,4
10,12
7,3
4,5
12,11
6,1
5,2
11,9
4,3
8,6
3,1
8,10
13,9
(11) 14 "attribute" engine 1,13
1,2
9,7
2,4
10,12
7,3
4,5
12,11
6,1
5,2
14,12
11,9
4,3
10,14
8,6
3,1
8,10
13,9
(11) 15 "attribute" engine 11,13
1,2
8,15
9,7
2,3

-continued 10,12
7,3
4,5
12,11
6,1
14,12
11,0
4,3
10,1
8,6
15,14
3,1
8,10
13,9

In all the above, the numbers in the pairs (e.g. "13,9") signify the two attributes in terms of the rank order of their "importance" ratings by the user. For instance, "13,9" signifies the $13^{th}$ most important attribute and the $9^{th}$ most important attribute.

Criteria Matching Heuristic

According to another aspect, the present invention includes a criteria matching heuristic for determining alternatives available to a user based on information received from the user.

One of the critical issues in applying a decision tool to the selection of an "alternative" is ensuring the "user" is presented with those "alternatives" that are available to him/her in the marketplace. Especially within the realm of health care plan choice, plans are often times available only based on specific, and sometimes complicated criteria (zip code, employment status, etc). In addition, not only does the "user" need to be "matched" to those product "alternatives" available to them, but they must also be presented with the "attributes" and "attribute settings" that apply to them. For example, users" looking for health plan coverage for a family will need to see a different set of premiums than do users looking for self-coverage. These two pre-requisites, match users to the appropriate "alternatives" and "attribute settings," are critical to the goal of providing the "user" with an accurate and useful end product.

The present invention, in attempting to solve these requirements, includes a unique criteria matching solution. This solution relies on a data driven mechanism that automates and "genericizes" the process of matching "users" to "alternatives" and "attribute/attribute settings," regardless of the "alternative" category and "attributes" involved. The criteria matching system works as follows:

1) Specific criteria, which may be used to link a "user" to an "alternative" or "attribute," are created. This could include such things as "single" or "family" or "full time," etc. These criteria are populated in a database table.
2) The "attributes" to be used in the project are also populated in a separate database table.
3) A "join" table is created that links which criteria apply to each of the "alternatives."
4) An "alternative" can have multiple criteria associated with it, while a criteria can be associated with multiple "alternatives."
5) The "alternatives" to be used in the project are populated in a separate database table.
6) A "join" table is created that links the criteria that apply to each of the "attributes."

7) An "alternative" can have multiple criteria associated with it, while criteria can be associated with multiple "attributes."

Part of the selector tool described above is the "registration." This is the initial step that requires the user to input criteria determining questions, such as "What is your zip code," etc. These registration questions are also data driven—that is, the questions and the responses are drawn from one data table and are written to another data table. The answers to these registration questions are linked, via another join table, to the criteria that have been established for the project.

Once the user answers registration questions, the responses trigger a look up of which criteria apply to the user. Using this criteria and the criteria-"alternative" and criteria-"attribute" join tables, the user is automatically matched with the "alternatives" and "attributes" that are applicable to them. One example would be the question, "are you a member of any of the following unions? APWU, Mailhandlers or Postal Workers. If the user answers "yes," and selects APWU, then the application would only match the user's preferences to plans which are available to members of this union and with the benefit structure of that plan which is only available to members of that union. Another example might be a user's answer to the questions, 1) what is your age, and 2) are you eligible for Medicare? Again, if the user answers "Yes," the user will only be shown plans to which that user is eligible and at the rates that are applicable to person's eligible for Medicare.

This structure has been developed so that it is "alternative"-category and "attribute" in-specific; it is a highly flexible methodology for meeting the purpose of joining users to "alternatives" and "attributes."

Criteria Matching Heuristic Example

The following is an abbreviated example of how the criteria matching heuristic works for a health plan selection tool according to an embodiment of the present invention. In this example, the following assumptions are made:

There are 2 types of employees, Union 1 and Union 2.

For any given plan, premium varies by coverage level as well as the union to which the employee belongs.

Employees can choose from 2 types of coverage levels—individual coverage and family coverage.

There are 6 possible health plans:
    2 available in NY zip codes (Plan A, Plan B)
    2 available in NJ (Plan C, Plan D)
    1 available nationally (Plan E)
    1 available regardless of coverage area, but the employee must belong to Union 1 (Plan F)

The following questions can be presented to each employee through a graphical user interface:

Question 1: What Union do you belong to?
1. Union 1
2. Union 2

Question 2: What type of coverage level are you looking for?
1. Individual
2. Family Question 3: What is your zip code?

The following tables are used by the selector tool to match users with attributes and products. Each of these tables may be stored in a computer-readable medium, such as a memory device.

TABLE 1

Criteria - Defines the criteria needed for the project to match users with attributes and products (such as health plans). Note the ZipCodeExclusive flag may be used to prevent certain user groups from being matched to products based on coverage area (zip code) if need. The ZipCodeExclusive flag is not used in this example.

| Criteria_ID | Description | CriteriaType | ZipCodeExclusive |
|---|---|---|---|
| 1 | All Users | Ubiquitous | N |
| 2 | Union 1 | Ubiquitous | N |
| 3 | Union 2 | Ubiquitous | N |
| 4 | Union 1, Individual | Attribute | N |
| 5 | Union 1, Family | Attribute | N |
| 6 | Union 2, Individual | Attribute | N |
| 7 | Union 2, Family | Attribute | N |
| 8 | Individual | Attribute | N |
| 9 | Family | Attribute | N |

TABLE 2

ProductCriteria - Defines which plans are matched via criteria. There are two steps to matching users to products (plans). Step one is by association with criteria. Step two is by zip code coverage.

| Criteria_ID | Product_ID |
|---|---|
| 2 | 6 |

TABLE 3

ProductAttribute - Defines the attributes for a project

| ProductAttribute_ID | Description |
|---|---|
| 1 | Premium |
| 2 | Annual Deductible |
| 3 | Chiropractic |

TABLE 4

Product - Defines the products (such as health plans) for a project

| ProductAttribute_ID | Description |
|---|---|
| 1 | Plan A |
| 2 | Plan B |
| 3 | Plan C |
| 4 | Plan D |
| 5 | Plan E |
| 6 | Plan F |

TABLE 5

AttributeOption - Defines the possible variants
of attributes for a project. For example, while
there is one attribute "annual deductible,"
there are 2 sets of values for each plan -
the individual value and the family value.
Depending on the desired coverage level, users
should be matched to the appropriate plan values.

| ProductAttribute_ID | Criteria_ID | Description |
|---|---|---|
| 1 | 4 | Premium, Union 1, Individual |
| 1 | 6 | Premium, Union 2, Individual |
| 1 | 5 | Premium, Union 1, Family |
| 1 | 7 | Premium, Union 2, Family |
| 2 | 8 | Annual Deductible, Individual |
| 2 | 9 | Annual Deductible, Family |
| 3 | 1 | Chiropractic |

TABLE 6

ProductCoverage - Associates Products with zip codes.
In Table 6, the zip codes have been abbreviated as
"new york zips" and "new jersey zips"
for purposes of this example. In a real project,
for each product, a record would exist for each
zip code associated with the product.

| Zipcode | Product_ID |
|---|---|
| (new jersey zips) | 1 |
| (new jersey zips) | 2 |
| (new york zips) | 3 |
| (new york zips) | 4 |
| (both new york and new jersey zips) | 5 |

Steps for Performing Criteria Matching Heuristic

1. The user is asked to answer the registration questions. Depending on how the user answers the questions, criteria are associated with each user type.
2. Once users are associated with criteria, joins are done to determine which products are available to the user. This is a 2-step process. In step 1 users are matched with plans that are only associated by criteria (not coverage area (zip code)). The ProductCriteria table (Table 2) is used for this purpose.
    In step 2 users are matched to products by coverage area (zip code). The ProductCoverage table (Table 6) is used for this purpose.
3. In addition, to joining the user with products, users are also matched to their appropriate attributes; that is, the attributes that are available and pertinent to their decision, based on the registration questions.
4. Once these joins have been done, the user can proceed with using the tool.

Sample Answers and Results

1. The user answers Q1 "Union 1," Q2 "individual" and Q3 as a New Jersey zip code.
2. 4 criteria are associated with the user: 1, 2, 4 and 8
3. Step 1 of matching the user with the products available to the user is to see if any of the user's criteria meet the ProductCriteria conditions. In this case, the user would be eligible for product_id 6 (Plan F) since the user's criteria of 2 matches a record in the ProductCriteria table (Table 2).
4. Step 2 of matching the user with the products available to the user is to see which plans, if any, are available to the user due to the user's zip code. In this case product_ids 1 (Plan A), 2 (Plan B) and 4 (Plan E) would be available to the user based on the zip code that the user entered.
5. Now the user is matched with attributes. Given the user's criteria, the user would be matched with the ProductAttribute_id/Criteria_id combinations of 1,4 (Premium, Union 1, Individual) 2, 8 (Annual deductible, Individual) and 3, 1 (Chiropractic, all users). With this identified, the tool can ensure the user trades off between the relevant attributes, and that the attribute values used for each plan are appropriate for the user.

Other Applications

Although the invention has been described above with regard to health plan selection, the present invention is not limited to such an embodiment. The selector tool software according to the present invention can be modified to assist users in almost any complex decision. Examples of additional applications of the selector tool software are discussed in detail below.

At the core of the selector tool software are seven steps:
1. Create a list of product or service attributes, which can be objectively collected for all products or services offered. Create levels for these attributes so their values can be compared.
2. Allow users of the software to simply click on those attributes or features, which are important to them.
3. For each attribute selected, show the high and low levels for each, and ask the user to determine how important the difference between the extremes are in their selection process.
4. Using the algorithms discussed above, present the user with unique combinations (paired comparisons) of attributes which they have indicated as very important, and force them to make trade-off decisions between hypothetical plans/products which contain these features.
5. Present the results of their preference exercise by showing them all products available to them in priority order, based on how well each product fits the user's profile
6. Allow the user to access a "Compare" feature, which allows the user to compare any four plans or products; side-by-side, feature-by-feature
7. Allow the user to purchase or enroll in whatever they choose.

One additional application of the invention is to assist patients and physicians in making complex medical decisions. For instance, the selector tool can be used to help patients choose between angioplasty or bypass. It can be used to help patients choose between radical mastectomy or lumpectomy or choosing between drugs.

Another application for the present invention is a virtual on-line brokerage firm, initially offering health plans to small businesses nationwide.

Another application of the invention is for a company which can broker energy company services in de-regulated states. There are already more than 15 states which are deregulated and more are moving in this direction. The selector tool will allow businesses and consumers to click on what is important to them, make trade-offs (for instance between cost, comfort, green-power, other bundled services, etc.) and have the software tell them which plan fits their needs best.

Yet another application for the selector tool is for an Internet-based recruiting business. Such a business would be tremendously empowered through use of the selector tool technologies. With monster.com, for instance, searching is done based on simple questionnaires. The results are simply a list, in no priority order, of resumes or positions that fit a simple set of criteria. With selector tool technology, both the employers looking for employees, and consumers looking for positions, would be asked to fill out a detailed profile, which would be databased. Then, when either party is doing a search, they would go through the attribute selection, importance of difference and trade-off exercises; and the system would list all possibilities, in priority order as to how well they fit the preference profile. This would be much more efficient than currently available systems.

Yet another application of the invention is selection of assisted living facilities. The parents of millions of "baby boomers" are now at a time in their lives when they are considering full-care retirement centers, rest and nursing homes. There is no good source for them to search for centers which fit their needs economically, geographically and in terms of life-style needs. A web-based retirement home selection application would be a perfect use of the selector tool set. The company managing such a tool will database information on every retirement center and rest-home in America (or the world) and allow the users to click on what is important to them and make trade-offs. The tool would then list all centers which fit the preference profile of the user, in priority order as to how well they fit that person's desires.

Yet another application for the present invention is home selection. The MLS system has an existing database and an individual or couple could click on attributes ranging from price, distance from work and schools, style, etc. and quickly match their desires with homes that are available in any region they wish to explore. The selector tool would allow the user to select attributes that are important to the user, go through the importance and trade-off screen, and present the user with a listing of homes and corresponding utility values indicating which home most closely fits the user's preferences.

Still another application of the invention is selection of educational institutions. Choosing a college or university is always a challenge. There are books (Fiske and others) which offer a great deal of data, but searching is clumsy and unsophisticated on currently available web sites. The present invention could easily database college and university information, have links to their web sites and offer a powerful prioritizing service. Perhaps an even bigger market could be community-based, helping parents and students choose magnet schools, charter schools and other primary schools. This will become an increasingly big market because there is increasing interest in developing competition for schools in order to drive-up quality of schools through increased competition. School systems would fund implementation of a web-based educational institution selector tool, with research revenue and marketing fees to schools creating a powerful revenue stream.

Yet another application of the invention is an on-line dating service. Most on-line dating services ask a series of questions and perform a simple matching process. A selector tool would allow a wide variety of attributes to be selected by a user, importance of differences calculated between extremes and then trade-offs made. This could be the only on-line dating service which would show the user, in priority order, those people who fit them best. Such a tool could even include prototypical pictures of faces, bodies, etc for selection and trade-off.

Still another user for the present invention is to assist companies in making complex business decisions. Most major companies spend months and months, and thousands of dollars on staff and consultants to choose vendors for major hardware, software, builders, etc. The selector tool could be used to streamline evaluation of vendors in extremely complex situations.

As an example, a hospital is attempting to determine which new electronic medical records system should be purchased and implemented. Usually, a task force is established and an expensive consulting firm is retained. It takes months to specify the requirements, identify prospective vendors, interview vendors, write an RFP, evaluate the RFPs and make a selection. The tool would first be used with all key staff people within the hospital (finance, medical records, nurses, physicians, etc.), who would go through the selector tool in a mock selection. The selector tool will have in the system, every possible attribute to be considered in selection of a medical records system. All key people would take, for instance, 1 hour to thoughtfully go through the site, click on attributes, rate importance of difference and make trade-offs. The tool would then produce a report showing precisely what attributes are most important and even segmenting the results by divisions. This would greatly speed up the process of developing the RFP. After vendors respond to the RFP, real data from each vendor would be put into the selector tool and the same hospital staffers would go through the tool, this time to make a real selection. The selector tool would then show results for each users and aggregate the data from all users to show which system fits the needs of the hospital best. It would show every vendor, in priority order of fit, and then allow senior staff to configure and refine requirements and show which vendor is a best fit. This tool set could reduce decision time in half and increase consensus among staff member.

Other Business-to-Business Concepts

There are almost unlimited uses for the selector tool set for complex decision making in business. Below are just a few more concepts:

1. Helping employees with relocation
2. Choosing hospitals
3. Choosing physicians
4. Choosing consulting firms
5. Choosing architectural firms
6. Choosing commercial real estate
7. Choosing ISPs or ASPs
8. Choosing resorts
9. Choosing any benefits Thus, as is apparent from the examples above, the selector tool according to the present invention greatly facilitates complex decision making in a variety of fields.

Scalability, Adaptability, and Efficiency

Figure 9:
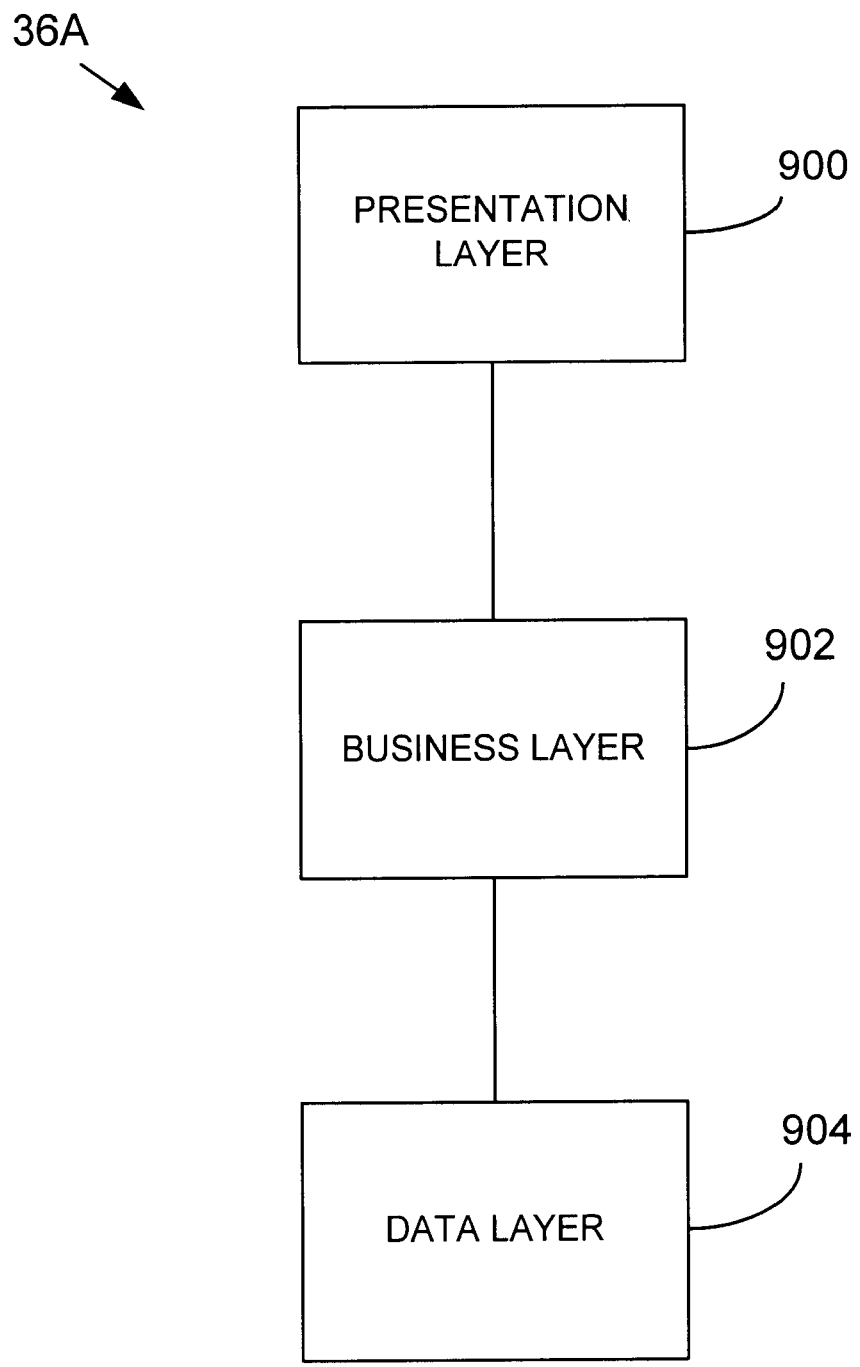
FIG. 9 is a block diagram of a layered selector tool server according to an embodiment of the present invention.

Another aspect of the present invention is its scalability and ability to adapt to different applications. FIG. 9 shown below is a block diagram of a preferred embodiment of a selector tool server according to the present invention. In FIG. 9, selector tool server 36A includes presentation layer 900, business layer 902, and data layer 904. Presentation layer 900 contains functions for presenting text and graphics to the user. Business layer 902 includes components, which are separately compiled from application layer code, and extract and store data in data layer 904. Data Layer 904 stores data, such as attributes and available products or services, for a given application.

Presentation layer 900 may be written in any suitable presentation layer language, such as Microsoft Active Server Pages (ASP). Microsoft ASP is a script-based language that uses HTML for presentation. The Present invention is not limited to using Microsoft ASP. Other languages that could be used include JSP—a Java-based language, or Cold Fusion. Presentation layer 900 is written to handle any client and any complex decision. Components that change from one application to another are data driven. For example, in order to modify the selector tool for use with a new application, it is not necessary to modify the code that creates the various graphical user interfaces. It is only necessary to modify data that changes from one application to the next, which is stored in data layer 904. For example to change from a health plan selector tool to a 401(k) selector tool, it is only necessary to change the attributes and the available plans in data layer 904.

According to another aspect of the invention, selector tool server 36A runs session-less. For example, when user when the user changes from one screen to the next, server identification of the user was previously accomplished using a session-level variable. Currently, a temporary cookie is created in the user's browser when a user first accesses the tool. The cookie holds a unique identifier to identify the user as the user changes from page to page.

According to yet another aspect of the invention, no database calls done through presentation layer 900. All calls to the database are done via components, which are part of business layer 902. Using components to access data greatly reduces overhead. As discussed above, a component is a separately compiled piece of code with a dedicated function, such as "get product IDs available for this user." These components are called by presentation layer 900 when the function is needed. For example, for the attribute selection page, an attribute selection component extracts the attributes that are available for a specific user. Another component present in business layer 902 is the conjoint analysis engine, which is described in detail above.

According to another aspect of the invention, content, such as instructions for using the tool and other material displayable by the selector server, is preferably located in a content database in data layer 904. Storing the content in a content database allows content to be quickly altered and customized for new clients or changing client needs. Data layer 904 may be implemented using any suitable database language, such as Microsoft Structured Query Language (SQL) Server Version 7.0.

According to yet another aspect of the invention, the underlying data schema has been created to be flexible and "generic." As used herein, the phrase "data schema" refers to the data structures and databases in data layer 904 used to generate the attributes and questions presented to the user. Rather than product or company-specific data structures, data structures are now generic. For example, rather that having a data structure created around the specific functional needs and specificities of a single client/product (i.e., health plans available to XYZ Corporation), a generic data schema has been developed that accommodates the data needs of the application regardless of the client and or product category. As a result providing generic data structures, the selector tool can be used for multiple clients and among multiple product categories, with little if any changes to the data schema.

According to another aspect of the invention, all frequently used query objects are indexed. A query object is a field in a database in data layer 904 that the selector tool might access. Indexing allows faster access to frequently accessed data.

As a result of the features listed above and factors relating to efficient coding, the selector tool server is capable of meeting the needs of multiple clients simultaneously. Current load testing demonstrates ability to handle 2,000 or more concurrent users.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for facilitating user selection among complex alternatives using conjoint analysis, the method comprising:

using a software-implemented selector tool:

(a) obtaining demographic information from a user;

(b) executing a criteria matching heuristic, wherein the criteria matching heuristic automatically selects products or services and attributes associated with the products or services that are available to the user by accessing a first table that associates the demographic information with criteria identifiers and accessing a second table that matches criteria identifiers with products or services;

(c) presenting the user with a list of the attributes associated with the products or services available to the user and requiring the user to select among the attributes those which are of importance to the user;

(d) presenting the user with a first series of choices requiring the user to input or select first values indicating the relative importance of a best setting and a worst setting for each of the attributes selected by the user;

(e) presenting the user with a second series of choices requiring the user to input or select second values indicating the relative importance of the user's preference between first and second pairings of the selected attributes, wherein each pairing includes a best setting of one attribute and a worst setting of another attribute;

(f) responsive to receiving the first and second values from the user, applying automated conjoint analysis to the first and second values, wherein applying automated conjoint analysis includes:

(i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes;

(g) in response to completion of the automated conjoint analysis, rating the products or services available to the user based on the final importance values for the attributes linked to the corresponding stored product or service alternatives; and (h) in response to completion of the calculating and the rating, automatically providing feedback from the conjoint analysis to the user, wherein providing feedback includes presenting the user with data indicating the relative utility to the user of each of the products or services.

2. The method of claim 1 wherein presenting the user with a list of attributes includes providing a graphical user interface for displaying the attributes to the user and receiving user selections of the attributes.

3. The method of claim 2 wherein providing a graphical user interface includes providing a graphical user interface using an application resident on a computer local to the user.

4. The method of claim 2 wherein providing a graphical user interface includes providing a graphical user interface using a server application resident on a computer remote from the user.

5. The method of claim 1 wherein requiring the user to input or select first values includes presenting discrete choices indicative of the relative importance of each attribute and requiring the user to select one of the discrete choices.

6. The method of claim 5 wherein presenting discrete choices to the user includes providing a graphical user interface having an importance of difference selection portion for allowing the user to select one of the discrete choices.

7. The method of claim 6 wherein providing a graphical user interface includes providing a graphical user interface using a program resident on a computer local to the user.

8. The method of claim 6 wherein providing a graphical user interface includes providing a graphical user interface using a server resident on a computer remote from the user.

9. The method of claim 1 wherein presenting the user with a second series of choices includes presenting the user with discrete choices indicating the relative importance of the difference between each pairing of attributes.

10. The method of claim 9 wherein presenting discrete choices to the user includes providing a graphical user interface having a difference in importance selection portion for allowing the user to select one of the discrete choices.

11. The method of claim 10 wherein providing a graphical user interface includes providing a graphical user interface using a program resident on a computer local to the user.

12. The method of claim 10 wherein providing a graphical user interface includes providing a graphical user interface using a server resident on a computer remote from the user.

13. The method of claim 1 wherein rating the products or services available to the user includes adding the final importance values of attributes associated with each product or services and presenting the sums to the user.

14. The method of claim 13 wherein presenting the sums to the user includes presenting the sums to the user using a graphical user interface.

15. The method of claim 14 wherein presenting the sums to the user using a graphical user interface includes presenting the sums to the user using a graphical user interface generated by an application program resident on a computer local to the user.

16. The method of claim 14 wherein presenting the sums to the user using a graphical user interface includes generating the graphical user interface using a server resident on a computer remote from the user.

17. The method of claim 1 wherein obtaining demographic information from the user includes presenting the user with a series of computer screens having questions relating to the user.

18. The method of claim 1 wherein the products or services include employer-sponsored health plans.

19. The computer program product of claim 1 wherein obtaining demographic information from the user includes presenting the user with a series of computer screens having questions relating to the user.

20. The method of claim 1 wherein the attributes and the product or services alternatives are stored in a database.

21. The method of claim 20 wherein the attributes and product or service alternatives comprise non-company-specific attributes and product or service alternatives.

22. A method for facilitating user selection among complex alternatives using conjoint analysis, the method comprising:

using a software-implemented selector tool:

(a) presenting a user with a list of attributes relating to a product or service and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:

(i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes, wherein calculating a final importance value includes:

(a) generating a Y vector including the first values and the mathematical differences;

(b) generating an X matrix having a first portion indicating the ordering of the first values in the Y vector and second portion indicating the pairing of attributes corresponding to each mathematical difference in the Y vector;

(c) computing regression coefficients based on the Y vector and X matrix; and (d) interpreting the regression coefficients as importance scores for attributes corresponding to the regression coefficients;

(e) in response to completion of the automated conjoint analysis, rating the products or services based on the final importance values; and (f) presenting the user with data indicating the relative utility to the user of each of the products or services.

23. The method of claim 22 wherein calculating a final importance value for each of the attributes includes taking each regression coefficient as the value of the worst setting of an attribute and five times the final computed importance value as the best setting of the attribute and using linear interpolation to determine the final importance value.

24. The method of claim 23 wherein the final importance values for each of the attributes are unitless quantities.

25. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
  (i) interpreting each of the second values as a mathematical difference between the relative importance of a best setting and a worst setting for one attribute and a best setting and a worst setting for another attribute; and
  (ii) calculating, based on the first values and the mathematical differences, a final importance value for each of the attributes;

(e) responsive to completion of the conjoint analysis, rating the products or services based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the predetermined products or services include mutual funds.

26. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
  (i) interpreting each second values as a mathematical difference between the relative importance of a best setting and a worst setting for one attribute and a best setting and a worst setting for another attribute; and
  (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the predetermined products or services include consumer goods other than health plans.

27. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
  (i) interpreting each of the second values as a mathematical difference between the relative importance of a best setting and a worst setting for one attribute and a best setting and a worst setting for another attribute; and
  (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user, with data indicating the relative utility to the user of each of the products or services, wherein the products or services include medical services.

28. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
  (i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the products or services include energy providers.

29. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:

(i) interpreting each second values as a mathematical difference between the relative importance of a best setting and a worst setting for one attribute and a best setting and a worst setting for another attribute; and (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the products or services include assisted living facilities.

30. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:

(i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the products or services include educational institutions.

31. A method for facilitating user selection among complex alternatives using conjoint analysis, the method comprising:

using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:

(i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user, wherein providing feedback includes presenting the user with data indicating the relative utility to the user of each of the products or services, wherein the products or services include potential employees or employers.

32. A method for facilitating user selection among complex alternatives using conjoint analysis, the method comprising:

using a software-implemented selector tool:
(a) presenting a user with a list of attributes relating to predetermined products or services and requiring the user to select among the attributes those which are of importance to the user;
(b) presenting the user with a first series of choices requiring the user to input or select first values indicating the relative importance of a best setting and a worst setting for each of the selected attributes;
(c) presenting the user with a second series of choices requiring the user to input or select second values indicating the relative importance of the user's preference between first and second pairings of the selected attributes, wherein each pairing includes a best setting of one attribute and a worst setting of another attribute;
(d) applying automated conjoint analysis to the first and second values, wherein applying automated conjoint analysis includes:
   (i) interpreting each of the second values as a mathematical difference between the relative importance of a best setting and a worst setting for one attribute and a best setting and a worst setting for another attribute; and
   (ii) calculating, based on the first values and the mathematical differences, a final importance value for each of the attributes;
(e) responsive to completion of the conjoint analysis, rating the products or services available to the user based on the final importance values and stored links between the attributes and the products or services; and
(f) responsive to completion of the rating, providing feedback from the conjoint analysis to the user, wherein providing feedback includes presenting the user with data indicating the relative utility to the user of each of the products or services, wherein the products or services include potential companions available through an on-line dating service.

33. A computer program product comprising a computer executable instructions embodied in a computer readable medium for performing steps comprising:

using a software-implemented selector tool:
(a) obtaining demographic information from a user;
(b) executing a criteria matching heuristic, wherein the criteria matching heuristic automatically selects products or services and attributes associated with the products or services that are available to the user by accessing a first table that associates the demographic information with criteria identifiers and accessing a second table that matches criteria identifiers with products or services;
(c) presenting a user with a list of the attributes associated with the products or services available to the user and requiring the user to select among the attributes those which are of importance to the user;
(d) presenting the user with a first series of choices requiring the user to input or select first values indicating the relative importance of a best setting and a worst setting for each of the selected attributes selected by the user;
(e) presenting the user with a second series of choices requiring the user to input or select second values indicating the relative importance of the user's preference between first and second pairings of the selected attributes, wherein each pairing includes a best setting of one attribute and a worst setting of another attribute;
(f) responsive to receiving the first and second values from the user, applying automated conjoint analysis to the first and second values, wherein applying automated conjoint analysis includes:
   (i) interpreting each of the second values as a mathematical difference between the relative importance of a best setting and a worst setting for one attribute and a best setting and a worst setting for another attribute; and
   (ii) calculating, based on the first values and the mathematical differences, a final importance value for each of the attributes;
(g) in response to completion of the automated conjoint analysis, rating the products or services available to the user based on the final importance values for the attributes linked to the corresponding stored product or service alternatives; and
(h) in response to the completion of the calculating and the rating, automatically providing feedback from the conjoint analysis to the user, wherein providing feedback includes presenting the user with data indicating the relative utility to the user of each of the products or services.

34. The computer program product of claim 33 wherein presenting the user with a list of attributes includes providing a graphical user interface for displaying the attributes to the user and receiving user selections of the attributes.

35. The computer program product of claim 34 wherein providing a graphical user interface includes providing a graphical user interface using an application resident on a computer local to the user.

36. The computer program product of claim 34 wherein providing a graphical user interface includes providing a graphical user interface using a server application resident on a computer remote from the user.

37. The computer program product of claim 33 wherein requiring the user to input or select first values includes presenting discrete choices indicative of the relative importance of each attribute and requiring the user to select one of the discrete choices.

38. The computer program product of claim 37 wherein presenting discrete choices to the user includes providing a graphical user interface having an importance of difference selection portion for allowing the user to select one of the discrete choices.

39. The computer program product of claim 38 wherein providing a graphical user interface includes providing a graphical user interface using a program resident on a computer local to the user.

40. The computer program product of claim 39 wherein providing a graphical user interface includes providing a graphical user interface using a server resident on a computer remote from the user.

41. The computer program product of claim 33 wherein presenting the user with a second series of choices includes presenting the user with discrete choices indicating the relative importance of the difference between each pairing of attributes.

42. The computer program product of claim 41 wherein presenting discrete choices to the user includes providing a graphical user interface having a difference in importance selection portion for allowing the user to select one of the discrete choices.

43. The computer program product of claim 42 wherein providing a graphical user interface includes providing a graphical user interface using a program resident on a computer local to the user.

44. The computer program product of claim 42 wherein providing a graphical user interface includes providing a graphical user interface using a program resident on a computer remote from the user.

45. The computer program product of claim 33 wherein rating the products or services available to the user includes adding the final importance values of attributes associated with each product or services and presenting the sums to the user.

46. The computer program product of claim 45 wherein presenting the sums to the user includes presenting the sums to the user using a graphical user interface.

47. The computer program product of claim 46 wherein presenting the sums to the user using a graphical user interface includes presenting the sums to the user using a graphical user interface generated by an application program resident on a computer local to the user.

48. The computer program product of claim 46 wherein presenting the sums to the user using a graphical user interface includes generating the graphical user interface using a server resident on a computer remote from the user.

49. The computer program product of claim 33 wherein the products or services include employer-sponsored health plans.

50. The computer program product of claim 33 wherein the products or services include mutual funds.

51. The computer program product of claim 33 wherein the products or services include consumer goods.

52. The computer program product of claim 33 wherein the products or services include medical services.

53. The computer program product of claim 33 wherein the products or services include energy providers.

54. The computer program product of claim 33 wherein the products or services include assisted living facilities.

55. The computer program product of claim 33 wherein the products or services include educational institutions.

56. The computer program product of claim 33 wherein the products or services include potential employees or employers.

57. The computer program product of claim 33 wherein the products or services include potential companions available through an on-line dating service.

58. The computer program product of claim 33 wherein the products or services include combinations of complementary products or services.

59. The computer program product of claim 58 wherein the products or services include employee benefits.

60. A method for facilitating user selection among complex alternatives using conjoint analysis, the method comprising:

using a software-implemented selector tool:

(a) presenting a user with a list of attributes relating to a product or service and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:

(i) interpreting each of the second values as a mathematical difference between the relative importance of a best setting and a worst setting for one attribute and a best setting and a worst setting for another attribute; and (ii) calculating, based on the first values and the mathematical differences, a final importance value for each of the attributes, wherein calculating a final importance value includes:

(a) generating a Y vector including the first values and the mathematical differences;

(b) generating an X matrix having a first portion indicating the ordering of the first values in the Y vector and second portion indicating the pairing of attributes corresponding to each mathematical difference in the Y vector;

(c) computing regression coefficients based on the Y vector and X matrix; and (d) interpreting the regression coefficients as importance scores for attributes corresponding to the regression coefficients; and (e) rating the products or services based on the final importance values; and (f) presenting the user with data indicating the relative utility to the user of each of the products or services.

61. The computer program product of claim 60 wherein calculating a final importance value for each of the attributes includes taking each regression coefficient as the value of the worst setting of an attribute and five times the final computed importance value as the best setting of the attribute and using linear interpolation to determine the final importance value.

62. The computer program product of claim 61 wherein the final importance values for each of the attributes are unitless quantities.

63. A system for facilitating user selection among complex alternatives using conjoint analysis, the system comprising:

(a) a user interface generator for executing a criteria matching heuristic, wherein the criteria matching heuristic automatically selects products or services available to the user by obtaining demographic information from the user, accessing a first table that associates the demographic information with criteria identifiers and accessing a second table that matches criteria identifiers with products or services, the user interface generator for presenting screens to a user on a computer display device that require the user to rate the relative importance of the selected attributes for the selected products or services and for receiving input from the user regarding the attributes; and (b) a conjoint analysis engine operatively associated with the user interface generator for receiving the user input for applying automated conjoint analysis to the user input, wherein applying automated conjoint analysis includes automatically calculating final importance values for each of the selected attributes and wherein the conjoint analysis engine is further adapted to calculate, based on the final importance values and the stored links between the selected attributes and the products or services, a total utility value for each of the products or services, and wherein the conjoint analysis engine is further adapted to provide feedback to the user based on the conjoint analysis, wherein providing feedback includes delivering the total utility values to the user interface generator, which displays to the user the products or services with ratings based on the total utility values.

64. The system of claim 63 wherein the user interface generator is adapted to present the user with a first series of screens requiring the user to rate the relative importance between high and low settings of individual attributes.

65. The system of claim 64 wherein the user interface generator is adapted to present the user with a second series of screens requiring the user to rate the relative importance of the difference between a high setting of a first attribute and a low setting of a second attribute versus a low setting of the first attribute and a high setting of the second attribute.

66. The system of claim 65 wherein the conjoint analysis engine is adapted to interpret user input with regard to the second series of screens as a mathematical difference between the relative importance of the high setting and the low setting for first attribute and the high setting and the low setting for the second attribute.

67. The system of claim 63 wherein the user interface generator and the conjoint analysis engine comprise application programs adapted for execution on a server computer remote from the user.

68. The system of claim 63 wherein the user interface generator and the conjoint analysis engine comprise application programs adapted for execution on a computer local to the user.

69. The system of claim 63 wherein the products or services include employer-sponsored health plans.

70. The system of claim 63 wherein the products or services include mutual funds.

71. The system of claim 63 wherein the products or services include consumer goods.

72. The system of claim 63 wherein the products or services include medical services.

73. The system of claim 63 wherein the products or services include energy providers.

74. The system of claim 63 wherein the products or services include assisted living facilities.

75. The system of claim 63 wherein the products or services include educational institutions.

76. The system of claim 63 wherein the products or services include potential employees or employers.

77. The system of claim 63 wherein the products or services include potential companions available through an on-line dating service.

78. The system of claim 63 comprising:
(a) a presentation layer containing generic functions for generating the screens to be presented to the user;
(b) a data layer containing data relating to the attributes and the products or services available to the user; and
(c) a business layer for facilitating communication between the data layer and the presentation layer.

79. The system of claim 78 wherein the conjoint analysis engine is implemented in the business layer.

80. The system of claim 63 wherein the complex alternatives include real estate.

81. The system of claim 80 wherein the user is a prospective real estate buyer.

82. The system of claim 63 wherein the products or services include combinations of complementary products or services.

83. The system of claim 82 wherein the products or services include employee benefits.

84. A method for facilitating user selection among complex alternatives using conjoint analysis, the method comprising:
using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
(i) interpreting each of the second values as a mathematical difference between the relative importance of a best setting and a worst setting for one attribute and a best setting and a worst setting for another attribute; and
(ii) calculating, based on the first values and the mathematical differences, a final importance value for each of the attributes;

(e) responsive to completion of the conjoint analysis, rating the products or services based on the final importance values and stored links between the attributes and the products or services; and (f) responsive to completion of the rating, presenting the user with data indicating the relative utility to the user of each of the products or services, wherein the products or services include combinations of complementary products or services.

85. The method of claim 84 wherein the products or services include employee benefits other than health plans.

86. A method for facilitating user selection among complex alternatives using conjoint analysis, the method comprising:
using a software-implemented selector tool:

(a) presenting a user with a list of attributes relating to predetermined products or services and requiring the user to select among the attributes those which are of importance to the user;

(b) presenting the user with a first series of choices requiring the user to input or select first values indicating the relative importance of a best setting and a worst setting for each of the selected attributes;

(c) presenting the user with a second series of choices requiring the user to input or select second values indicating the relative importance of the user's preference between first and second pairings of the selected attributes, wherein each pairing includes a best setting of one attribute and a worst setting of another attribute;

(d) applying automated conjoint analysis to the first and second values, wherein applying automated conjoint analysis includes:
(i) interpreting each of the second values as a mathematical difference between the relative importance of a best setting and a worst setting for one attribute and a best setting and a worst setting for another attribute; and
(ii) calculating, based on the first values and the mathematical differences, a final importance value for each of the attributes;

(e) responsive to completion of the conjoint analysis, rating the products or services available to the user based on the final importance values and stored links between the attributes and the products or services; and (f) responsive to completion of the rating, providing feedback from the conjoint analysis to the user wherein providing feedback includes presenting the user with data indicating the relative utility to the user of each of the products or services, wherein the products or services include 401(k) plans.

* * * * *